United States Patent
Hoisington

(10) Patent No.: US 10,040,559 B2
(45) Date of Patent: Aug. 7, 2018

(54) REDUCED FLOW FIELD VELOCITY FOR A PROPULSOR

(75) Inventor: Zachary C. Hoisington, Long Beach, CA (US)

(73) Assignee: The Boeing Company, Chicago, IL (US)

(*) Notice: Subject to any disclaimer, the term of this patent is extended or adjusted under 35 U.S.C. 154(b) by 125 days.

(21) Appl. No.: 13/189,545

(22) Filed: Jul. 24, 2011

(65) Prior Publication Data

US 2013/0020433 A1 Jan. 24, 2013

(51) Int. Cl.
*B64D 27/12* (2006.01)
*B64C 7/00* (2006.01)

(52) U.S. Cl.
CPC ............... *B64D 27/12* (2013.01); *B64C 7/00* (2013.01); *Y02T 50/44* (2013.01)

(58) Field of Classification Search
CPC ...................................................... B64C 7/00
USPC .... 244/55, 198, 199.1, 200–201, 203–204.1, 244/54, 62, 12.6, 13; D12/319, 339, 333, D12/334, 337, 340, 341
See application file for complete search history.

(56) References Cited

U.S. PATENT DOCUMENTS

| | | | | |
|---|---|---|---|---|
| 4,571,936 A | * | 2/1986 | Nash et al. | 60/797 |
| 4,667,900 A | * | 5/1987 | Kim | 244/53 B |
| 4,867,394 A | * | 9/1989 | Patterson, Jr. | 244/54 |
| 4,976,396 A | * | 12/1990 | Carlson et al. | 244/55 |
| 5,156,353 A | * | 10/1992 | Gliebe et al. | 244/54 |
| 5,348,256 A | * | 9/1994 | Parikh | 244/208 |
| 6,565,038 B2 | * | 5/2003 | Papandreadis | 244/12.2 |
| 2007/0272796 A1 | | 11/2007 | Stuhr | |
| 2008/0116322 A1 | | 5/2008 | May | |

FOREIGN PATENT DOCUMENTS

| | | |
|---|---|---|
| CN | 101306723 A | 11/2008 |
| CN | 102112262 A | 6/2011 |
| RU | 2353550 C1 | 4/2009 |

* cited by examiner

*Primary Examiner* — Brian M O'Hara
*Assistant Examiner* — Keith L Dixon
(74) *Attorney, Agent, or Firm* — McDonnell Boehnen Hulbert & Berghoff LLP

(57) ABSTRACT

A system and methods for reducing flow field velocity into a propeller is disclosed. An aerodynamic structure is enhanced to provide a reduced velocity flow field region, and a propeller is positioned in the reduced velocity flow field region.

16 Claims, 16 Drawing Sheets

REDUCED FLOW FIELD VELOCITY FOR A PROPULSOR

FIELD

Embodiments of the present disclosure relate generally to aircraft design. More particularly, embodiments of the present disclosure relate to design of aircraft propulsion systems and aerodynamic surfaces.

BACKGROUND

FIG. 1 is an illustration of an exemplary propulsive efficiency graph showing exemplary installed propulsive efficiency vs. Mach number curves 102/104/106/108 for several types of propulsion systems. As shown in FIG. 1, generally, slower aircraft (in a range from Mach 0.4 and 0.6) have more efficient propulsion options. Propellers with no outer ducts, nacelles, or shrouds can be very efficient, converting close to 90% of the engine's horsepower into thrust. As shown by the curve 104, at flight speeds above Mach 0.7, propellers become less practical because a speed of flow passing over rotating propeller blades approaches or exceeds Mach 1.0, where there is increased aerodynamic drag. High speed propellers have additional disadvantages with respect to noise, weight, complexity, and cost.

Therefore, as shown on the curve 108, turbofan engines are generally used on modern transports because they operate at flight speeds generally between Mach 0.75 and Mach 0.85 that are too fast for practical propellers. Turbofan engines generally have greater parasitic drag and lower disk area in comparison to a turboprop; however, turbofans generally convert only about 70% of shaft horsepower into thrust.

Fuel contributes to approximately half of direct operating cost for an airliner, and the future may bring higher fuel prices and increased environmental considerations such as carbon taxes. With increasing fuel prices and competition among aircraft manufacturers, there is a pressing need for more efficient aircraft.

SUMMARY

A system and methods for reducing flow field velocity into a propeller are disclosed. An aerodynamic structure is enhanced to provide a reduced velocity flow field deviation region, and a propeller is positioned in the reduced velocity flow field deviation region. In this manner, the propeller can operate at a higher efficiency at a higher aircraft operation speed.

In an embodiment, a method for reducing flow field velocity into a propeller enhances an aerodynamic structure to provide a reduced velocity flow field region. The method further positions a propulsor in the reduced velocity flow field region.

In another embodiment, a flow field velocity reduction system comprises an aerodynamic structure enhancement and a propulsor. The aerodynamic structure enhancement is suitably shaped to reduce flow field velocity in a flow field region near the aerodynamic structure enhancement. Thus, the aerodynamic structure enhancement provides a reduced flow field velocity deviation region. The propulsor is positioned in the reduced flow field velocity deviation region.

In yet another embodiment, a method for providing a flow field velocity reduction system provides an aerodynamic structure enhancement. The aerodynamic structure enhancement is suitably shaped to reduce a flow field velocity in a flow field region near the aerodynamic structure enhancement to provide a reduced velocity flow field region. The method further provides a propulsor positioned in the reduced velocity flow field region.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to aerodynamics, vehicle structures, fluid dynamics, and other functional aspects of systems described herein (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a practical non-limiting application, namely, an aircraft propeller. Embodiments of the disclosure, however, are not limited to such aircraft propeller applications, and the techniques described herein may also be utilized in other applications. For example but without limitation, embodiments may be applicable to turbofans, propfans, unducted fans, ship propellers, wind turbines, air propeller powered boats, and the like.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
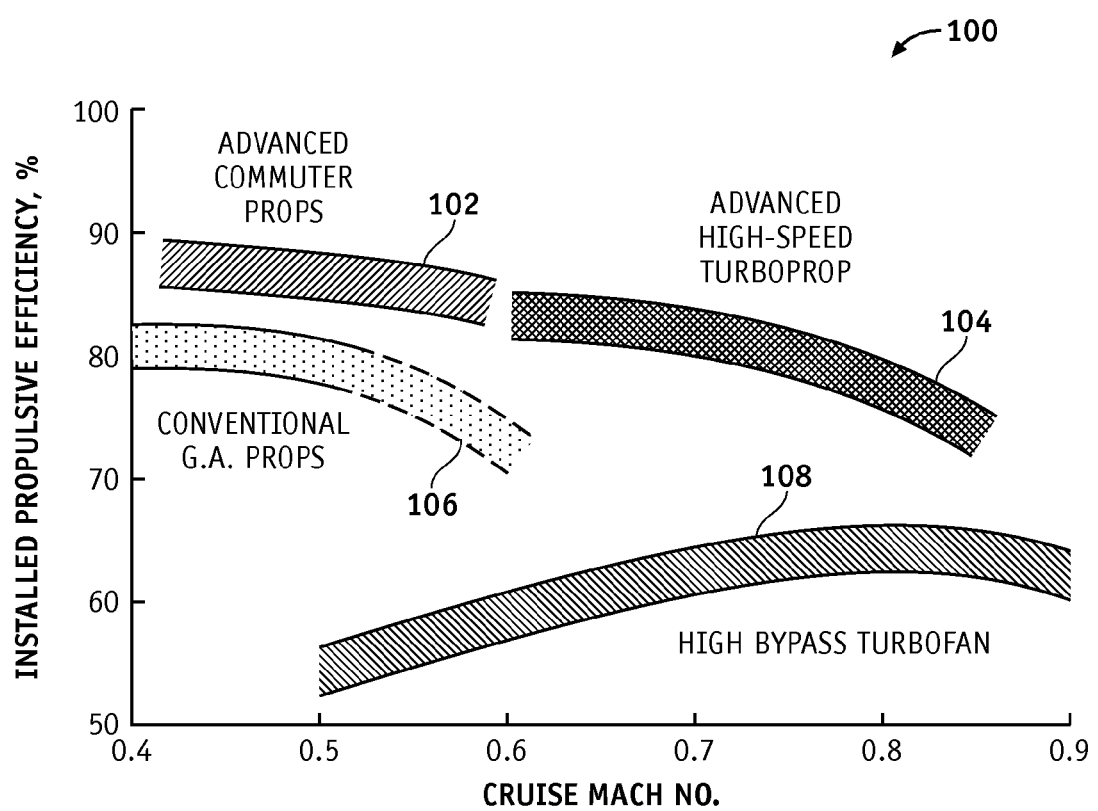
FIG. 1 is an illustration of an exemplary propulsive efficiency graph.
Figure 2:
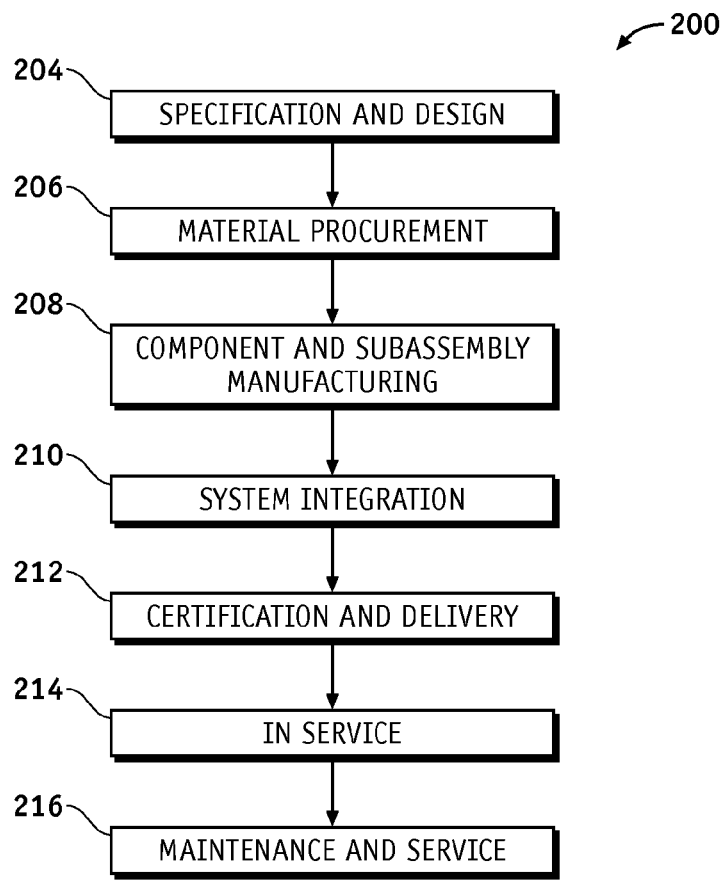
FIG. 2 is an illustration of a flow diagram of an exemplary aircraft production and service methodology.
Figure 3:
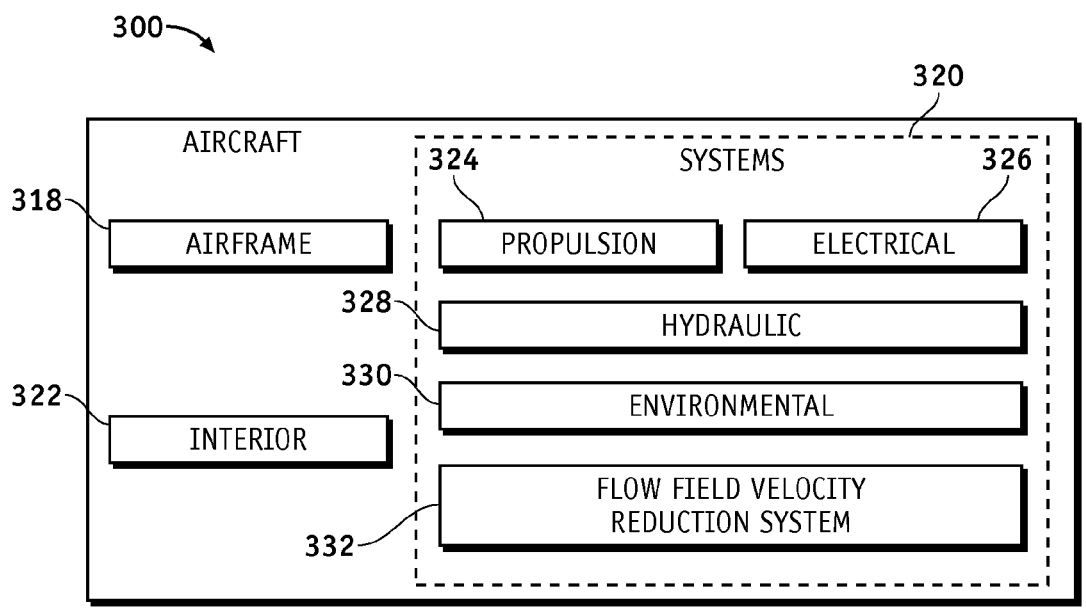
FIG. 3 is an illustration of an exemplary block diagram of an aircraft.

Referring more particularly to the drawings, embodiments of the disclosure may be described in the context of an exemplary aircraft manufacturing and service method 200 (method 200) as shown in FIG. 2 and an aircraft 300 as shown in FIG. 3. During pre-production, the method 200 may comprise specification and design 204 of the aircraft 300, and material procurement 206. During production, component and subassembly manufacturing 208 (process 208) and system integration 210 of the aircraft 300 takes place. Thereafter, the aircraft 300 may go through certification and delivery 212 in order to be placed in service 214. While in service by a customer, the aircraft 300 is scheduled for routine maintenance and service 216 (which may also comprise modification, reconfiguration, refurbishment, and so on).

Each of the processes of method 200 may be performed or carried out by a system integrator, a third party, and/or an operator (e.g., a customer). For the purposes of this description, a system integrator may comprise without limitation any number of aircraft manufacturers and major-system subcontractors; a third party may comprise without limitation any number of vendors, subcontractors, and suppliers; and an operator may be without limitation an airline, leasing company, military entity, service organization, and the like.

As shown in FIG. 2, the aircraft 300 produced by the method 200 may comprise an airframe 318 with a plurality of systems 320 and an interior 322. Examples of high-level systems of the systems 320 comprise one or more of a propulsion system 324, an electrical system 326, a hydraulic system 328, an environmental system 330, and a flow field velocity reduction system 332. Any number of other systems may also be included. Although an aerospace example is shown, the embodiments of the disclosure may be applied to other industries.

Apparatus and methods embodied herein may be employed during any one or more of the stages of the method 200. For example, components or subassemblies corresponding to production of the process 208 may be fabricated or manufactured in a manner similar to components or subassemblies produced while the aircraft 300 is in service. In addition, one or more apparatus embodiments, method embodiments, or a combination thereof may be utilized during production stages of the process 208 and the system integration 210, for example, by substantially expediting assembly of or reducing the cost of an aircraft 300. Similarly, one or more of apparatus embodiments, method embodiments, or a combination thereof may be utilized while the aircraft 300 is in service, for example and without limitation, to maintenance and service 216.

Embodiments of the disclosure provide increased propulsive efficiency for aircraft by allowing a propulsor to operate in a lower speed flow field than an aircraft's flight speed. By shaping a wing, fuselage, a control surface, and other features of the aircraft, an enveloping region of reduced flow field velocity can be created for placing a propulsion system. This allows the aircraft to have higher propulsive efficiency than what is normally possible. The reduced speed for the propulsion system may also allow for a different type of propulsor such as a propeller instead of a turbofan, resulting in a significant increase in propulsive efficiency.

Figure 4:
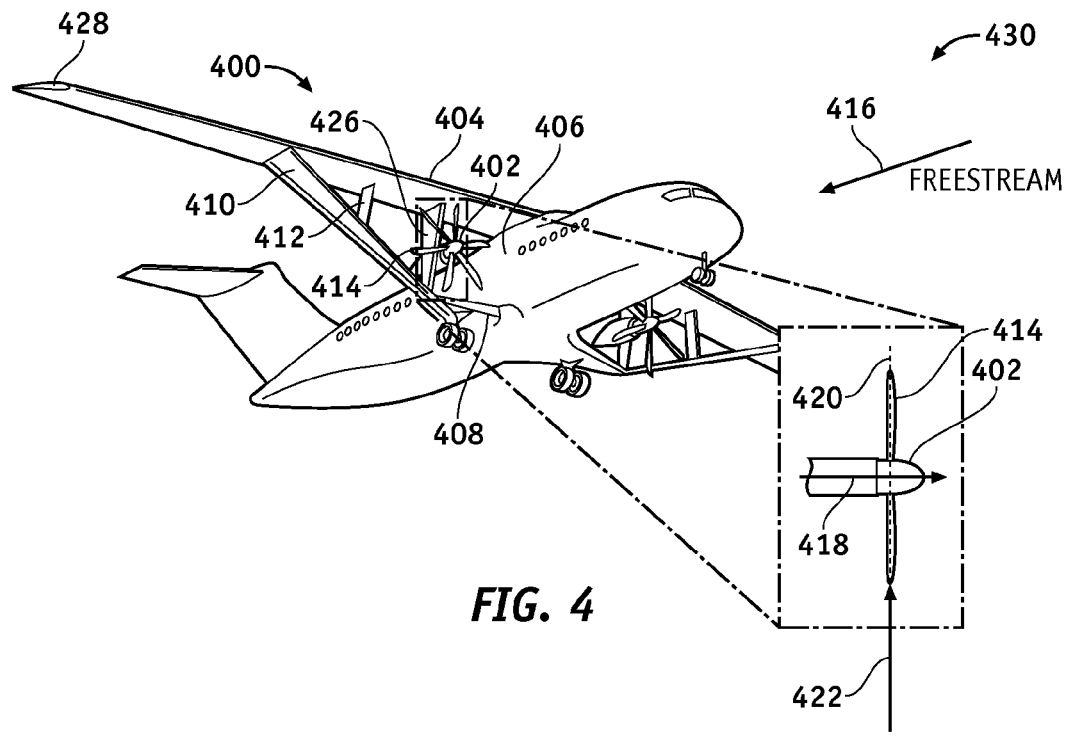
FIG. 4 is an illustration of an exemplary aircraft comprising a flow field velocity reduction system according to an embodiment of the disclosure.

FIG. 4 is an illustration of an exemplary aircraft 430 comprising a flow field velocity reduction system 400 (system 400) according to an embodiment of the disclosure. The system 400 comprises a propulsor 402, a wing 404 comprising an airfoil 428, a fuselage 406, a lower strut 408, a lateral strut 410, and a jury strut 412.

Figure 5:
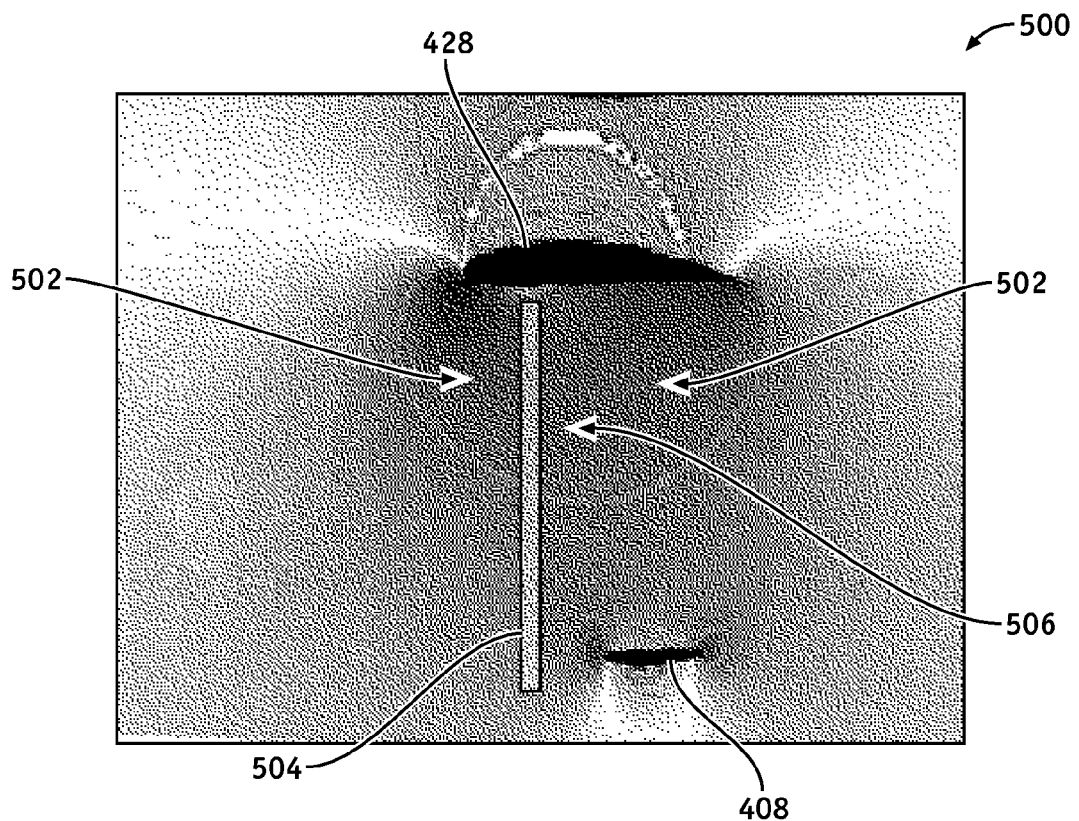
FIG. 5 is an illustration of an exemplary flow field around an airfoil of a wing of the aircraft of FIG. 4 showing a region of reduce velocity flow field according to an embodiment of the disclosure.

The propulsor 402 (propeller 402) may comprise, for example but without limitation, a propeller, a counter-rotating propeller, a contra-rotating propeller, a turbofan (e.g., geared or ungeared), a propfan, an unducted fan, a high-speed single-rotation propeller, a high-speed counter-rotating propellers, a high-speed contra-rotating propeller, a ducted fan, and the like. The propulsor 402 is positioned in relation to the wing 404, the fuselage 406, the lower strut 408, the lateral strut 410, and the jury strut 412 such that the propulsor 402 is in a region of a flow field (flow field region) with reduced velocity such as a reduced velocity flow field region 502 (FIG. 5). Furthermore, the reduced velocity flow field region 502 is generated such that flow field contours 506 near the propulsor 402 (propulsor operating surface 504 in FIG. 5) comprise a minimized velocity deviation. In this manner, the propulsor 402 is positioned in a reduced flow field velocity deviation region 502 (FIG. 5).

A flow field means a vector field of particles, and a velocity means a speed and direction of a particle, flow field, or aircraft. In this document, a reduced velocity flow field region 502, and a reduced flow field velocity deviation region 502 may be used interchangeably.

The embodiments shown in FIG. 4 show a two-engine airplane such as the aircraft 430 with the propeller(s) 402. Those skilled in the art will recognize that many other arrangements may be used according to various embodiments of the disclosure. For example but without limitation, a single engine, an engine driving multiple propulsors, four wing-mounted engines, various numbers of engines, tail mounted engines, and the like, may be used.

The strut 408/410/412 can increase the reduction in the flow field velocity and/or can increase a size of the reduced velocity flow field region 502. The strut 408/410/412 can also provide structural support to the wing 404, and can reduce the need for depth in the wing airfoil 428 near the propeller 402. This can enable the wing 404 shaping to strengthen the flow field velocity benefit.

The wing 404, the fuselage 406, the lower strut 408, the lateral strut 410, and the jury strut 412 may each comprise a structural enhancement operable to affect a flow field near the wing 404, the fuselage 406, the lower strut 408, the lateral strut 410, and the jury strut 412 respectively. The structural enhancement may comprise, for example but without limitation, an enhanced thickness of an aerodynamic structure, an added structure, a bump on an aerodynamic structure, an enhanced contour line, a notch in an aerodynamic structure, a lengthening of an aerodynamic structure, an extension of an aerodynamic structure, a widening of an aerodynamic structure, and the like, operable to reduce flow field velocity and/or increase flow field uniformity. The flow field uniformity may comprise, for example but without limitation, a region of parallel streamlines with substantially constant speed. The substantially constant speed may comprise, for example but without limitation, small variations such as two-degree variations in direction and 0.02 variations in Mach, and the like.

Shaping of an airfoil (cross section) of: the wing 404, struts 408/410/412, and other structures for the propeller 402 is only needed near the location of the propeller 402. The wing 404 will likely return to a more conventional shape inboard and outboard of the propeller 402.

In one embodiment a strut bracing such as the lateral strut 410 is used. This embodiment benefits from thin wing sections, because a thin wing will have lower velocities over both of its top and bottom surfaces for the same lift coefficient. The strut bracing allows for thinner wing sections without as much of a weight penalty as a cantilever wing. Therefore, this embodiment gets a larger benefit from using a strut braced wing.

In one embodiment a large fuselage cross section is used. Ground clearance may limit propeller size for an aircraft using smaller fuselage for the fuselage 406. A large cross section size for the fuselage 406 allows increasing a height of the wing 404 from a ground level. A double-deck or a wider body fuselage (such as a twin isle instead of a single isle) for the fuselage 406 would allow for easier integration of a high wing that has greater clearance from the ground level.

Embodiments of the disclosure, reduces skin friction drag below the wing 404. The embodiments create a region of reduced velocity below the wing 404, and since the skin friction drag is proportional to velocity squared, the skin friction drag is reduced. Therefore, nacelles (not shown), pylons such as the engine pylori 426, a spinner (not shown), and the like, will have less skin friction drag if they are located in the reduced velocity flow field region 502 according to embodiments of the disclosure.

Variations in speed and direction of an airflow into a disk of the blades 414 of the propeller 402 can adversely affect the performance of the propeller 402. For this reason, propellers are typically placed in locations where there is very little flow disturbance. For example, out in front of a wing for a larger aircraft, and on a nose of smaller aircraft.

If there is a constant variation of speed and direction of the airflow (inflow) into the propeller 402, but the airflow (inflow) into the propeller 402 is symmetrical about all planes of rotation such as a plane of rotation 420 that pass through a longitudinal axis 418 of the propeller 402, then blades 414 can be tailored so that there is no substantial impact on the performance of the propeller 402. However, turbulence and uneven disturbances in speed (Mach) and direction will change the loading on the blades 414 and degrade the performance of the propeller 402.

Embodiments of the disclosure align the airflow into the propeller 402 with the longitudinal axis 418 of the propeller 402 with varying aircraft angles of attack. For example, the wing 404 above the propeller 402 can straighten the airflow into the propeller 402 more than a propeller mounted far (not shown) in front of the wing 404. Embodiments of the disclosure reduce a variation in Mach number into a disk (e.g., a propulsor operating surface 504 in FIG. 5) formed by rotation of blades 414 of the propeller 402, reducing efficiency losses of the propeller 402.

FIG. 5 is an illustration of an exemplary flow field around the airfoil 428 of the wing 404 of the aircraft 430 (FIG. 4) showing the reduced velocity flow field region 502 near the propulsor operating surface 504 located under the wing airfoil 428 of the wing 404 according to an embodiment of the disclosure. The reduced velocity flow field region 502 may comprise, for example but without limitation, a region of a vector field of air particles with a reduced velocity relative to the freestream 416 providing a substantially constant speed. A streamline may comprise, for example but without limitation, path of a particle of air, and the like. The freestream 416 may comprise, for example but without limitation, undisturbed air far away from the aircraft 430, and the like. The propulsor operating surface 504 may comprise, for example but without limitation, a disk or plane that the propulsor 402 is operating therein, and the like.

Figure 6:
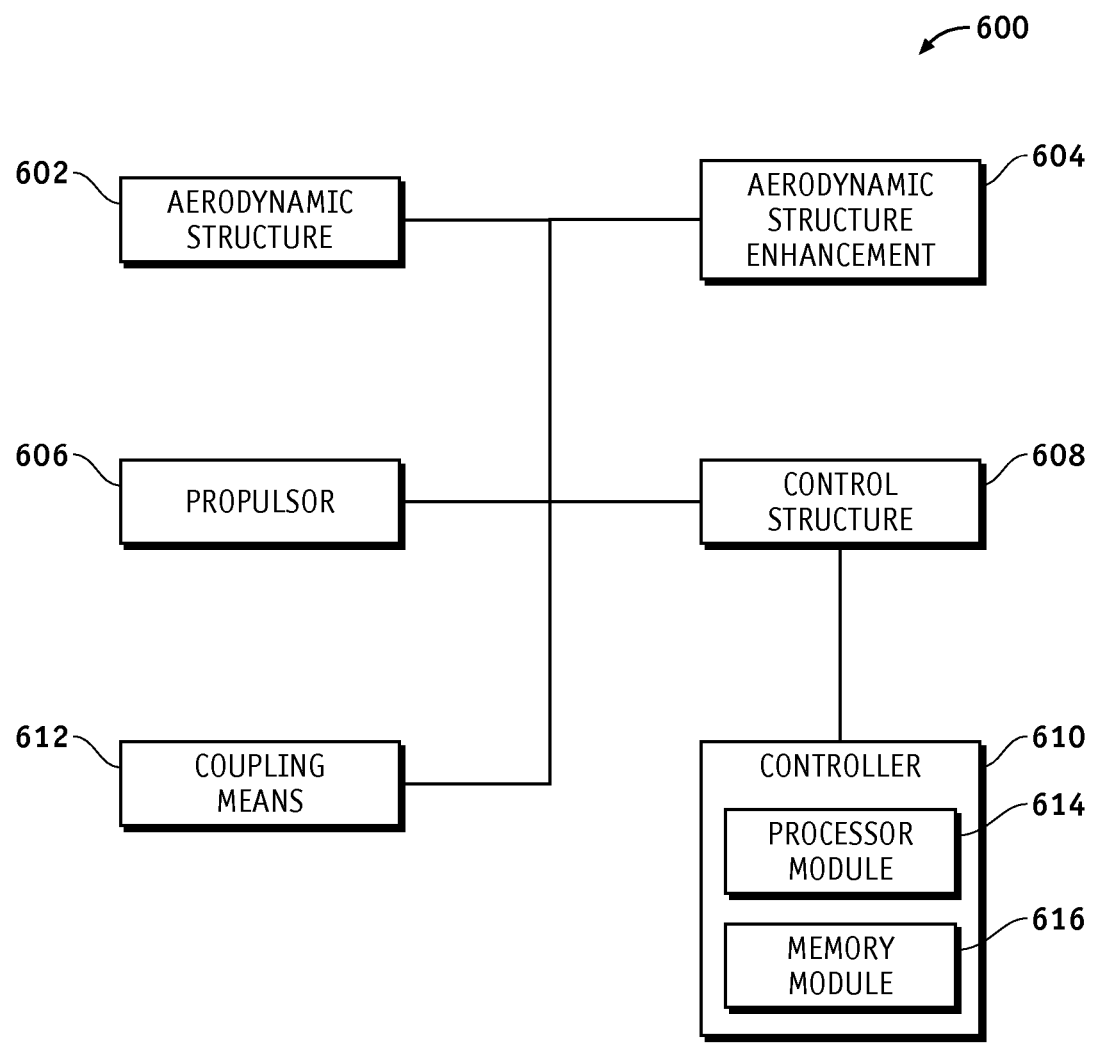
FIG. 6 is an illustration of an exemplary flow field velocity reduction system according to an embodiment of the disclosure.

FIG. 6 is an illustration of an exemplary flow field velocity reduction system 600 (system 600) according to an embodiment of the disclosure. The system 600 may comprise an aerodynamic structure 602, an aerodynamic structure enhancement 604, a propulsor 606, a control structure 608, and a controller 610. The aerodynamic structure 602, the aerodynamic structure enhancement 604, the propulsor 606, the control structure 608, and the controller 610 may be coupled to each other via various coupling means 612.

The aerodynamic structure 602 may comprise, for example but without limitation, the wing 404, the fuselage 406, the lower strut 408, the lateral strut 410, the jury strut 412, a winglet, an elevator, a spoiler, a rudder, an aileron, an elevon, and the like. The aerodynamic structure 602 is operable to change a first physical property to control the reduced velocity flow field region 502 (FIG. 5). Changing the first physical property may comprise, for example but without limitation, changing a shape of the aerodynamic structure 602, changing a position of a flap 1404 (FIG. 14), changing a position of the aerodynamic structure 602, and the like. The flap 1404 may be a hinged or sliding section of the aerodynamic structure 602 used to control lift.

The aerodynamic structure enhancement 604 may comprise, for example but without limitation, a concave shaped structure such as a bump, an enhanced contour line, an enhanced thickness, a notch, a lengthening, an extending, a widening, and the like. The aerodynamic structure enhancement 604 is operable to change a second physical property to control the reduced velocity flow field region 502 (reduced velocity flow field deviation region). Changing the second physical property may comprise, for example but without limitation, changing a shape of the aerodynamic structure enhancement, changing a position of the flap 1404 (FIG. 14), changing a position of the aerodynamic structure 602, a combination thereof, and the like.

The propulsor 606 (402 in FIG. 4) may comprise, for example but without limitation, a propeller, a turbofan, a propfan, a counter-rotating propeller, a contra-rotating propeller, an unducted fan, and the like.

The control structure 608 may comprise, for example but without limitation, a flap (e.g., the flap 1404), an aileron, a spoiler, a winglet, an elevator, a rudder, an aileron, an elevon, a combination thereof, and the like.

The controller 610 may comprise, for example but without limitation, a processor module 614, a memory module 616, and the like. The controller 610 is operable to control the control structure 608 to affect the reduced velocity flow field region 502 near the propulsor 606 (the propulsor operating surface 504 in FIG. 5).

For example but without limitation, an active control of a blade velocity 422 (FIG. 4) at the plane of rotation 420 (FIG. 4) of the propulsor 606, a deflection of a flap (e.g., the flap 1404 in FIG. 14), a split trailing edge (not shown), a gurney flap/Divergent Trailing Edge (DTE) (not shown), or a leading edge device (drooped leading edge) (not shown), may be used to control the blade velocity 422 (FIG. 4) at the plane of rotation 420 of the propulsor 606. In this manner, the blade velocity 422 is tuned for varying flight conditions. For example, during climb out, a higher ratio of propeller disc speed (magnitude of the blade velocity 422) to a speed of the freestream 416 (magnitude of a velocity of the freestream 416) may be more desirable than at the fastest cruise speed.

The processor module 614 comprises processing logic that is configured to carry out the functions, techniques, and processing tasks associated with the operation of the system 600. In particular, the processing logic is configured to support the system 600 described herein. For example, the processor module 614 may direct: the active control of blade velocity 422 at the plane of rotation 420 (FIG. 4) of the propulsor 606, the deflection of the flap 1404 (FIG. 14), the deflection of the leading edge device edge, and the like, to control the blade velocity 422 (FIG. 4) at the plane of rotation 420 of the propulsor 606 such that the blade velocity 422 is tuned for varying flight conditions.

The processor module 614 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 616 may comprise a data storage area with memory formatted to support the operation of the system 600. The memory module 616 is configured to store, maintain, and provide data as needed to support the functionality of the system 600. For example, the memory module 616 may store flight configuration data, the blade velocity 422, and the like.

In practical embodiments, the memory module 616 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 616 may be coupled to the processor module 614 and configured to store, for example but without limitation, a database, and the like. Additionally, the memory module 616 may represent a dynamically updating database containing a table for updating the database, and the like. The memory module 616 may also store, a computer program that is executed by the processor module 614, an operating system, an application program, tentative data used in executing a program, and the like.

The memory module 616 may be coupled to the processor module 614 such that the processor module 614 can read information from and write information to the memory module 616. For example, the processor module 614 may access the memory module 616 to access the aircraft speed, flight control surface positions, angle of attack, Mach number, altitude, the blade velocity 422, and the like.

As an example, the processor module 614 and memory module 616 may reside in respective application specific integrated circuits (ASICs). The memory module 616 may also be integrated into the processor module 614. In an embodiment, the memory module 616 may comprise a cache memory for storing temporary variables or other intermediate information during execution of instructions to be executed by the processor module 614.

The various coupling means 612 may comprise any coupling technology suitable for use by the system 600. The various coupling means 612 may comprise, for example but without limitation, a physical coupling such as; gluing, welding, and the like, an electronic coupling, and the like.

Figure 7:
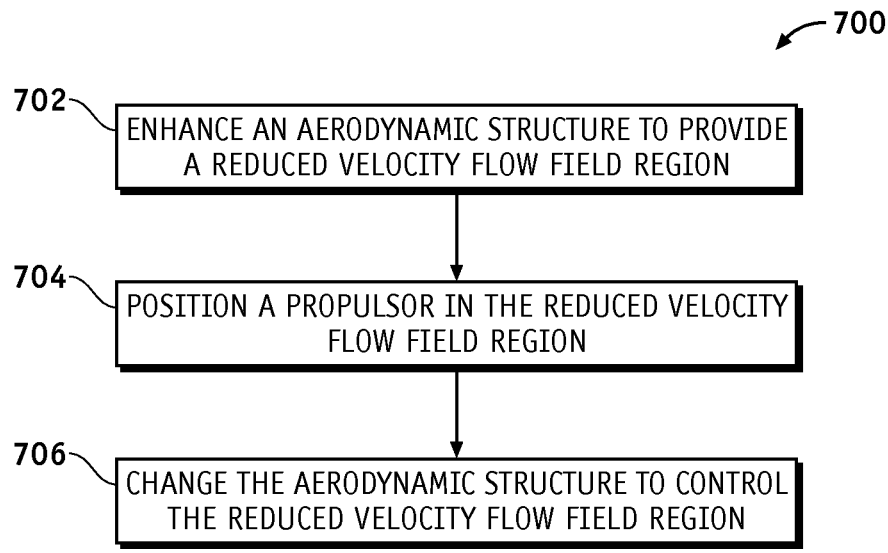
FIG. 7 is an illustration of an exemplary flowchart showing a flow field velocity reduction process according to an embodiment of the disclosure.

FIG. 7 is an illustration of an exemplary flowchart showing a flow field velocity reduction process 700 according to an embodiment of the disclosure. The various tasks performed in connection with process 700 may be performed mechanically, by software, hardware, firmware, a computer-readable medium having computer executable instructions for performing the processes methods, or any combination thereof. It should be appreciated that process 700 may include any number of additional or alternative tasks, the tasks shown in FIG. 7 need not be performed in the illustrated order, and the process 700 may be incorporated into a more comprehensive procedure or process having additional functionality not described in detail herein.

For illustrative purposes, the following description of process 700 may refer to elements mentioned above in connection with FIG. 2-6. In practical embodiments, portions of the process 700 may be performed by different elements of the system 600 such as: the aerodynamic structure 602, the aerodynamic structure enhancement 604, the propulsor 606, the control structure 608, the controller 610, etc. It should be appreciated that the process 700 may include any number of additional or alternative tasks, the tasks shown in FIG. 7 need not be performed in the illustrated order, and the process 700 may be incorporated into a more comprehensive procedure or process having additional functionality not described in detail herein. Process 700 may have functions, material, and structures that are similar to the embodiments shown in FIGS. 2-6. Therefore common features, functions, and elements may not be redundantly described here.

Process 700 may begin by enhancing an aerodynamic structure such as the aerodynamic structure 602 to provide a reduced velocity flow field region such as the reduced velocity flow field region 502 (task 702).

Process 700 may continue by positioning a propulsor such as the propulsor 606 in the reduced velocity flow field region 502 (task 704).

Process 700 may continue by changing the aerodynamic structure 602 to control the reduced velocity flow field region 502 (task 706). As mentioned above, the changing of the aerodynamic structure may comprise, for example but without limitation, changing a shape of the aerodynamic structure 602, changing a position of the aerodynamic structure 602, changing a position of the flap 1404, and the like.

Figure 8:
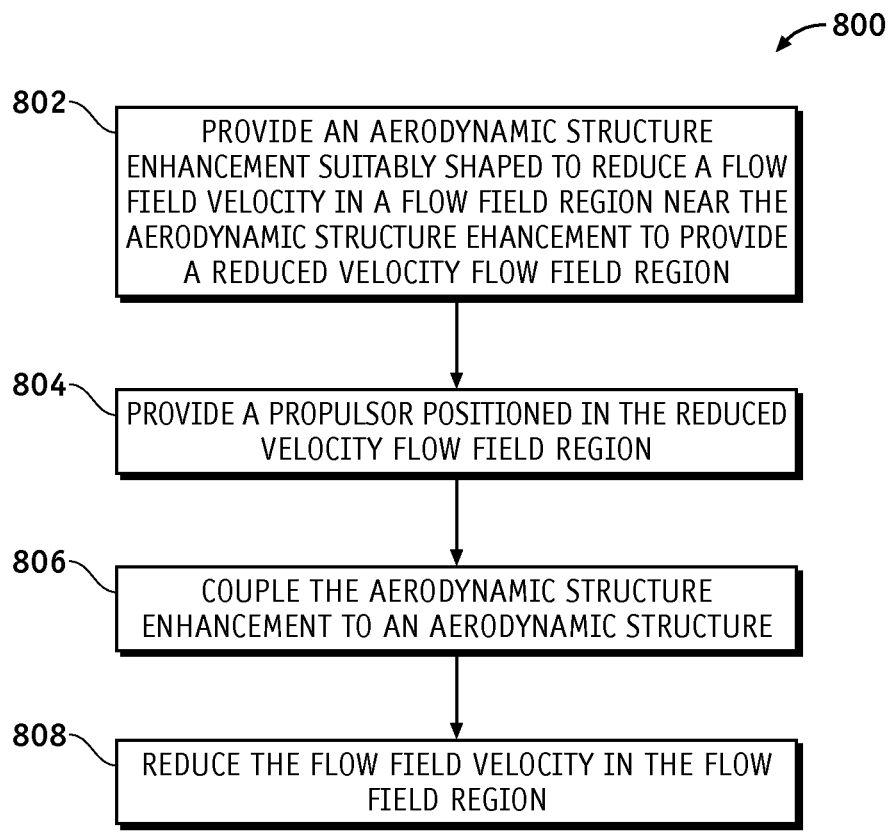
FIG. 8 is an illustration of an exemplary flowchart showing a process for providing a flow field velocity reduction system according to an embodiment of the disclosure.

FIG. 8 is an illustration of an exemplary flowchart showing a process 800 for providing a flow field velocity reduction system 600 according to an embodiment of the disclosure. The various tasks performed in connection with process 800 may be performed mechanically, by software, hardware, firmware, a computer-readable medium having computer executable instructions for performing the processes methods, or any combination thereof. It should be appreciated that process 800 may include any number of additional or alternative tasks, the tasks shown in FIG. 8 need not be performed in the illustrated order, and the process 800 may be incorporated into a more comprehensive procedure or process having additional functionality not described in detail herein.

For illustrative purposes, the following description of process 800 may refer to elements mentioned above in connection with FIG. 2-6. In practical embodiments, portions of the process 800 may be performed by different elements of the system 600 such as: the aerodynamic structure 602, the aerodynamic structure enhancement 604, the propulsor 606, the control structure 608, the controller 610, etc. It should be appreciated that the process 800 may include any number of additional or alternative tasks, the tasks shown in FIG. 8 need not be performed in the illustrated order, and the process 800 may be incorporated into a more comprehensive procedure or process having additional functionality not described in detail herein. Process 800 may have functions, material, and structures that are similar to the embodiments shown in FIGS. 2-6. Therefore common features, functions, and elements may not be redundantly described here.

Process 800 may begin by providing an aerodynamic structure enhancement such as the aerodynamic structure enhancement 604 suitably shaped to reduce a flow field velocity in a flow field region near the aerodynamic structure enhancement 604 to provide the reduced velocity flow field region 502 (task 802).

Process 800 may continue by providing a propulsor such as the propulsor 606 positioned in the reduced velocity flow field region 502 (task 804).

Process 800 may continue by coupling the aerodynamic structure enhancement 604 to an aerodynamic structure such as the aerodynamic structure 602 (task 806).

Process 800 may continue by reducing the flow field velocity in the flow field region (task 808).

Figure 9:
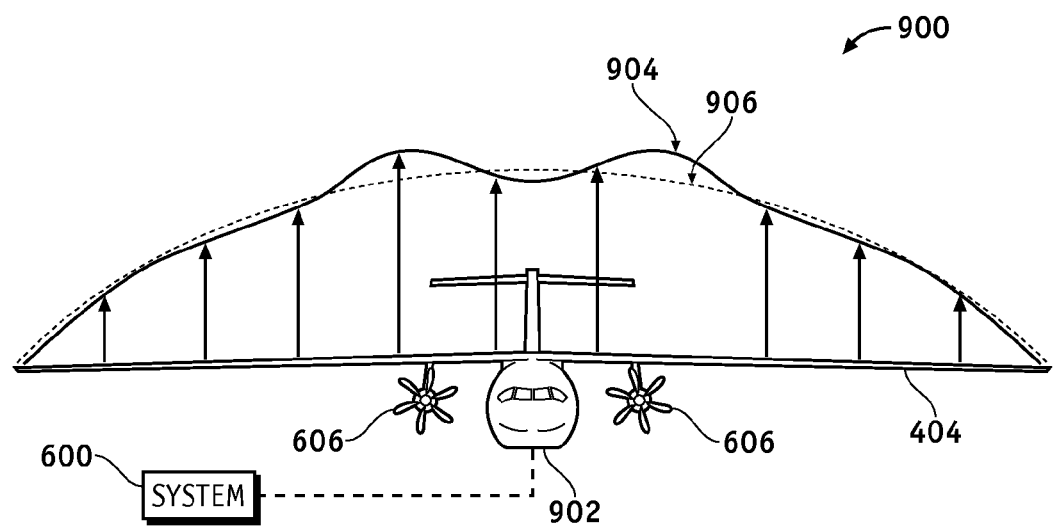
FIG. 9 is an illustration of an exemplary span wise lift distribution of an aircraft comprising a flow field velocity reduction system according to an embodiment of the disclosure.

FIG. 9 is an illustration of an exemplary span wise lift distribution 900 of an aircraft 902 comprising the flow field velocity reduction system 600 according to an embodiment of the disclosure. Induced drag increases when the span-wise lift distribution is non-elliptic, or comprises discontinuities. Embodiments of the disclosure provide greater amounts of lift, due to reducing the velocity below the wing 404. Therefore, it is beneficial to have a higher lift coefficient near the propulsor 606 to increase the benefit. FIG. 9 shows a lift distribution 904 generated by using the system 600 according to an embodiment of the disclosure, and a typical lift distribution 906 generated without using the system 600. Unlike the typical lift distribution 906, the overall lift distribution 904 may show, for example, greater amounts of lift on the wing 404 in a proximity of the propulsor 606.

Figures 10, 11:
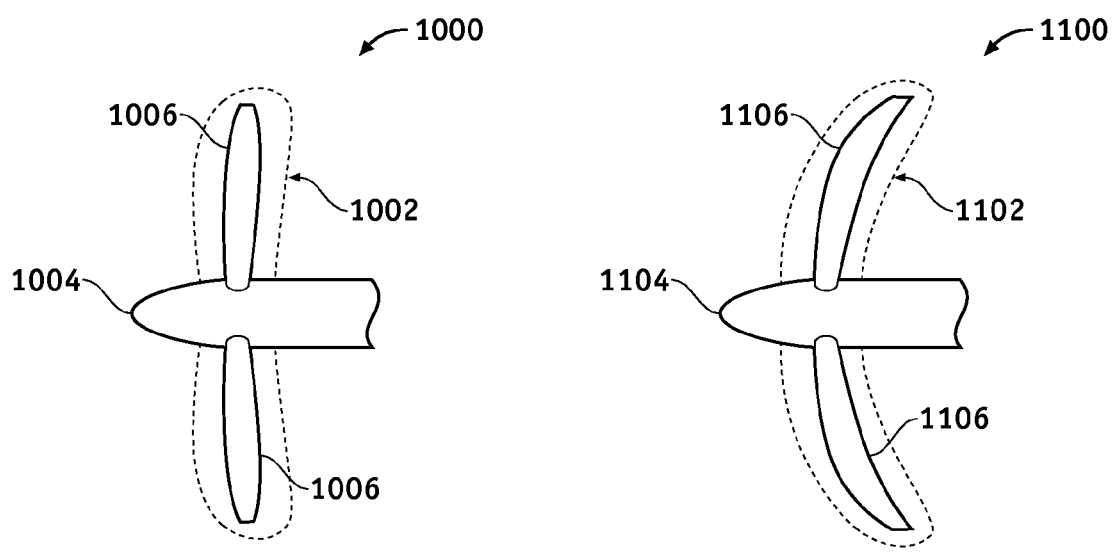
FIG. 10 is an illustration of an exemplary region of uniform velocity for an unswept propeller according to an embodiment of the disclosure.
FIG. 11 is an illustration of an exemplary region of uniform velocity for a swept or scimitar blade propeller according to an embodiment of the disclosure.

FIG. 10 is an illustration of an exemplary region of uniform velocity 1002 for an unswept blade propeller 1004 comprising an unswept blade 1006 according to an embodiment of the disclosure.

FIG. 11 is an illustration of an exemplary region of uniform velocity 1102 for a swept or scimitar blade propeller 1104 comprising a swept blade 1106 according to an embodiment of the disclosure. Propeller blade shape variations may comprise a sweep, changing the region of interest from a plane to a swept or other shape. The swept blade 1106 may be advantageous because it allows for greater efficiency and reduced noise at higher speeds than a blade having a plane shape such as the unswept blade 1006.

Figure 12:
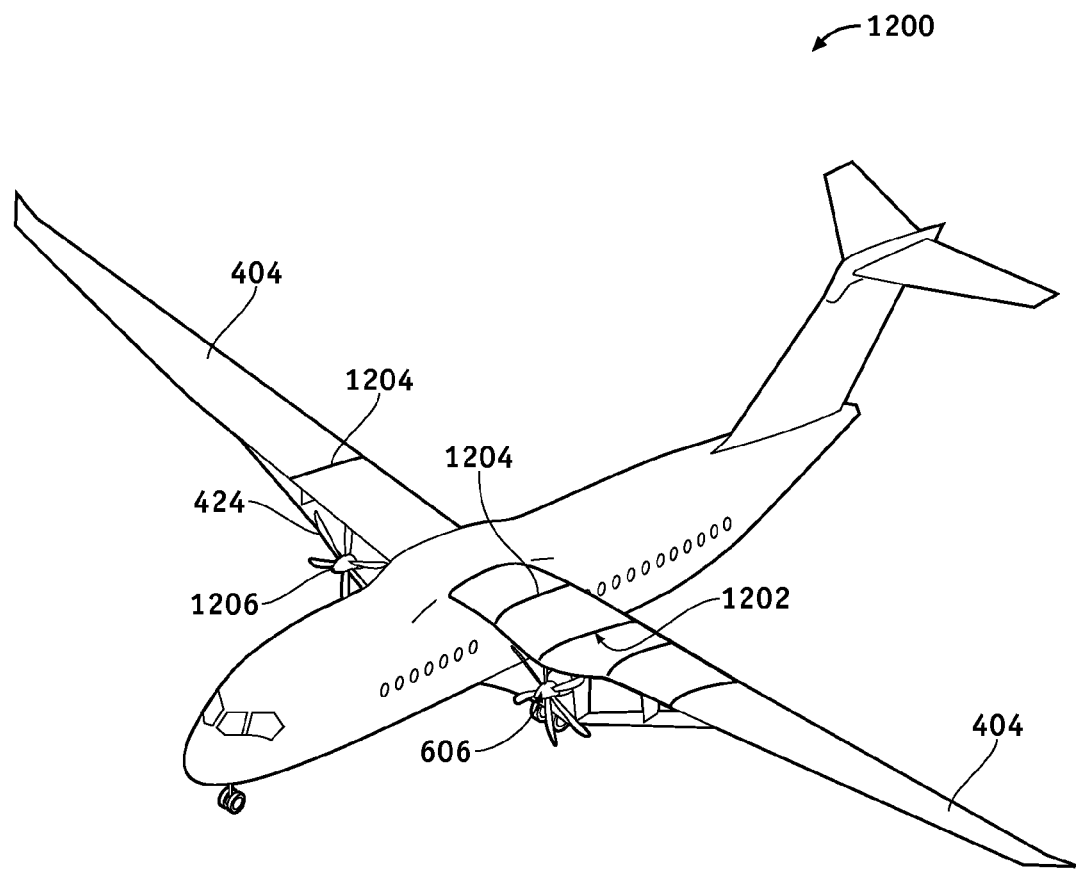
FIG. 12 is an illustration of an exemplary chord length extension near a propeller according to an embodiment of the disclosure.

FIG. 12 is an illustration of an exemplary local chord length extension 1202 near the propulsor 606 providing the aerodynamic structure enhancement 604 according to an embodiment of the disclosure. A size of a flow filed that is influenced by the wing 404 is notionally proportional to the wing chord 1204. Therefore, varying the wing chord 1202 near the propulsor 606 is advantageous. In the embodiment shown in FIG. 12, the wing chord 1202 is slightly longer above the propeller 606 than the wing chord 1202 along a span of the wing 404 away from the propeller 606. Advantages of a longer chord such as the wing chord 1202 near the propulsor 606 comprises, for example but without limitation, structurally allowing for a thinner wing section (thickness over local chord), allowing the propulsor 606 to be more forward of the wing 404 which may be safer if one of the blades 414 non-optimally releases from a hub 1206, and the like.

Figure 13:
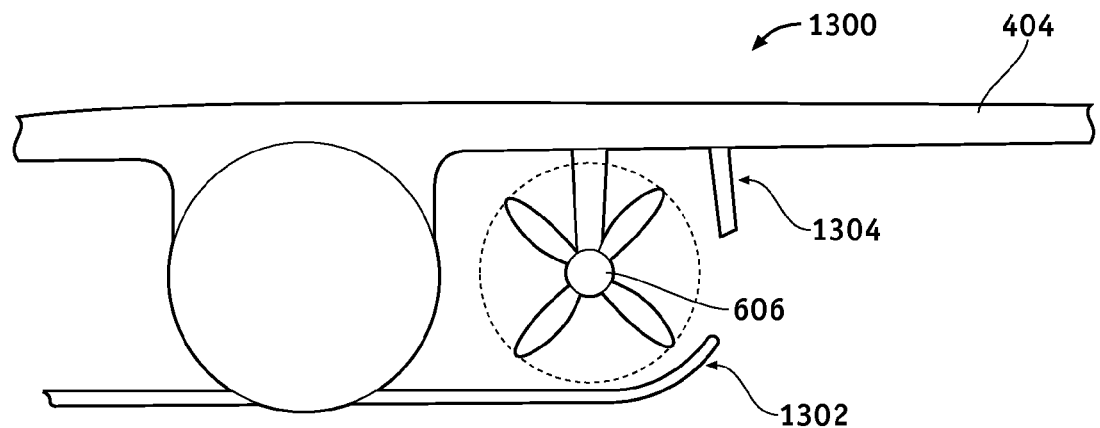
FIG. 13 is an illustration of exemplary aerodynamic structure enhancements that are added structures to reduce flow field velocity according to an embodiment of the disclosure.

FIG. 13 is an illustration of exemplary aerodynamic structural enhancements that are added structures to reduce flow field velocity according to an embodiment of the disclosure. In the embodiment shown in FIG. 13, aerodynamic surfaces 1302 and 1304 are additional aerodynamic structural enhancements that are used to tailor the airflow. In this manner, the additional aerodynamic surfaces 1302 and 1304 are used to create or enhance the flow field for the propulsor 606.

Figure 14:
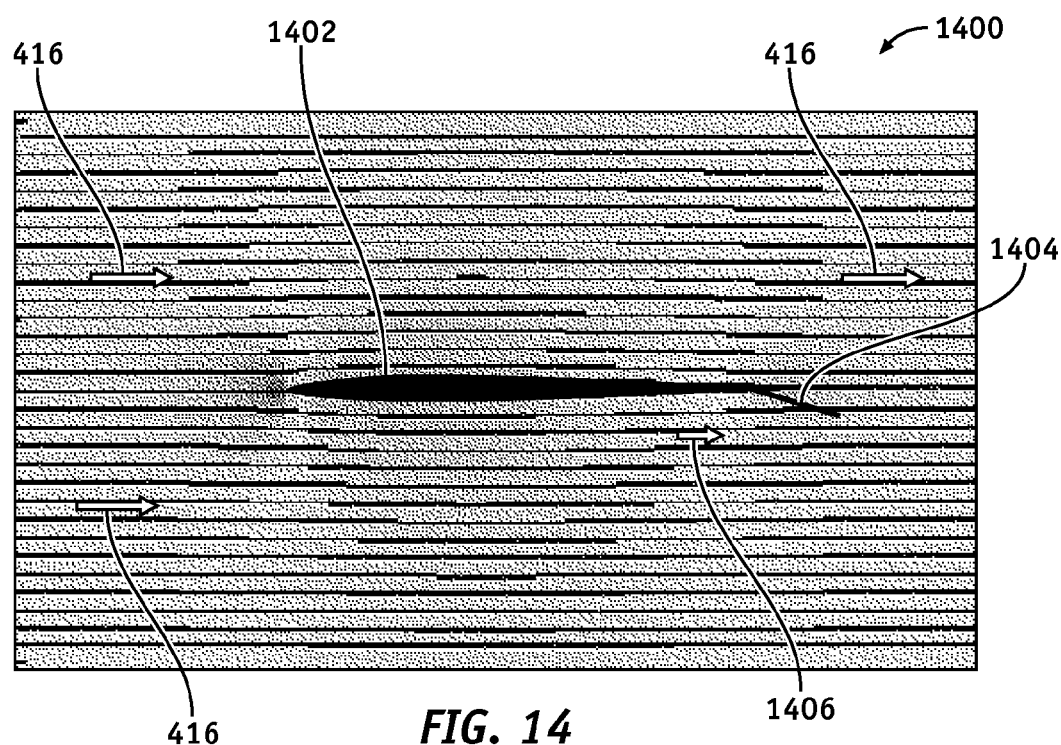
FIG. 14 is an illustration of an exemplary flow field around a symmetrical airfoil of an aircraft wing showing defection of a flap according to an embodiment of the disclosure.

FIG. 14 is an illustration of an exemplary flow field 1400 around a symmetrical airfoil 1402 (airfoil 1402). In FIG. 14, the symmetrical airfoil 1402 is shown at zero angle of attack, the airfoil 1402 is generating no lift, and the majority of the flow around the airfoil 1402 is travelling at approximately a velocity of the freestream 416. The freestream 416 may be diverted by an enhanced structure such as the flap 1404 to create, adjust or change a region to provide reduced velocity flow field. A velocity vector 1406 shows the reduced flow field velocity due to deflection of the flap 1404.

Figure 15:
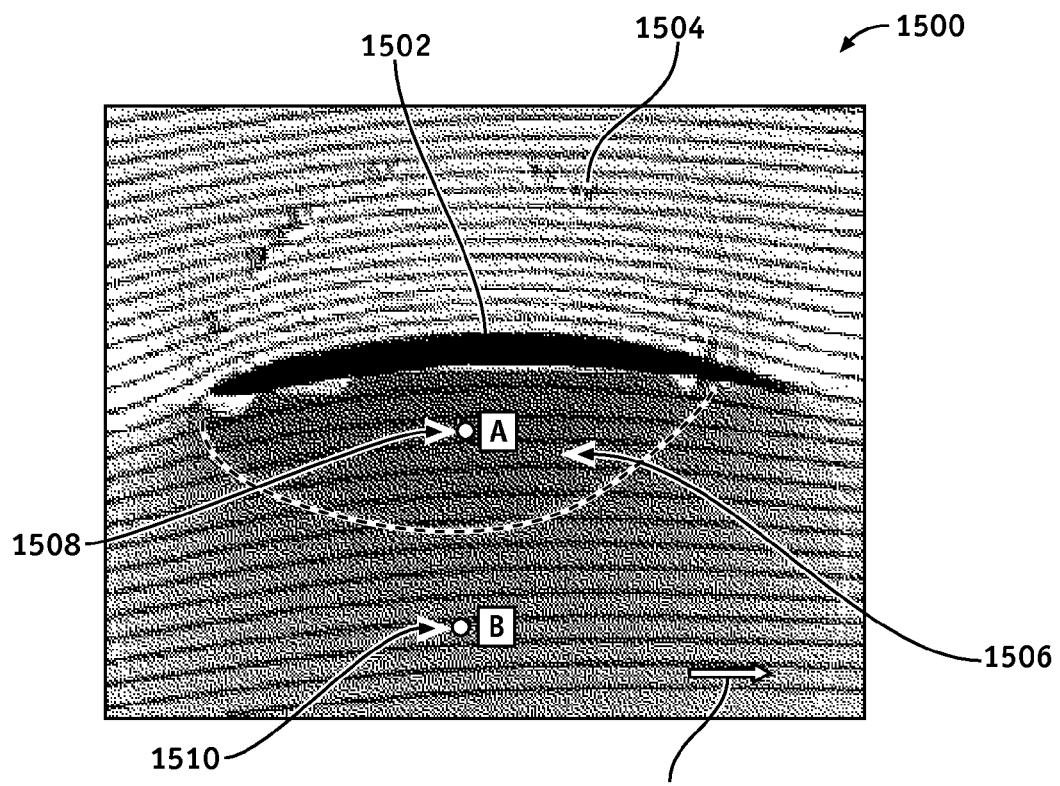
FIG. 15 is an illustration of an exemplary flow field with non-uniform velocity around an airfoil.

FIG. 15 is an illustration of an exemplary flow field 1500 with non-uniform velocity around an airfoil 1502. In FIG. 15, a camber is added to the airfoil 1402 of FIG. 14 to generate lift 1504. There is a large region 1506 beneath the airfoil 1502 with a flow that is much slower than a velocity of the freestream 416. However, an area comprising the freestream 416 (e.g., near point B) is not suitable for the propulsor 606 because a flow gradually accelerates as distance is increased below the airfoil 1502. For example, the velocity at a point A 1508 is much slower than the velocity at a point B 1510.

Figure 16:
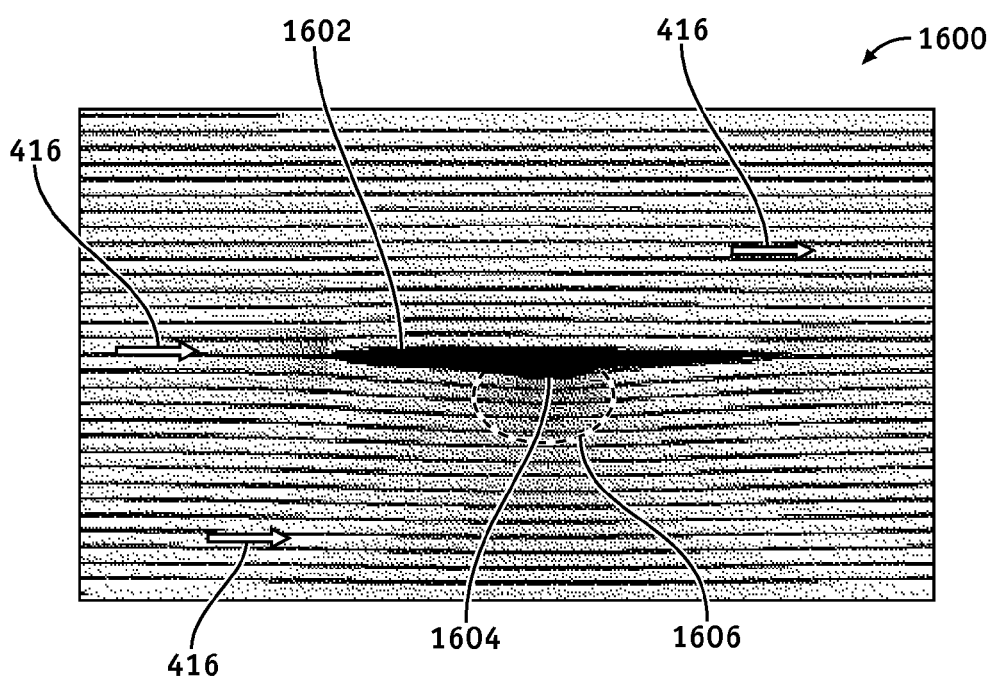
FIG. 16 is an illustration of an exemplary flow field showing a region of uniform flow field velocity near a structural enhancement on an underside of a wing airfoil according to an embodiment of the disclosure.

FIG. 16 is an illustration of an exemplary flow field 1600 showing a region 1606 of uniform flow field velocity near a structural enhancement such as a bump 1604 on an underside of the airfoil 1602 according to an embodiment of the disclosure. The embodiment shown in FIG. 16 shows a flow field for a flat plate such as an airfoil 1602 with the bump 1604 on the undersurface thereof that speeds up a flow near the bump 1604. The flow returns to the velocity of the freestream 416 as distance is increased below the airfoil 1602. The bump 1604 provides a concentrated acceleration that tapers off to the velocity of the freestream 416 more quickly than it does in the embodiment shown in FIG. 15.

Figure 17:
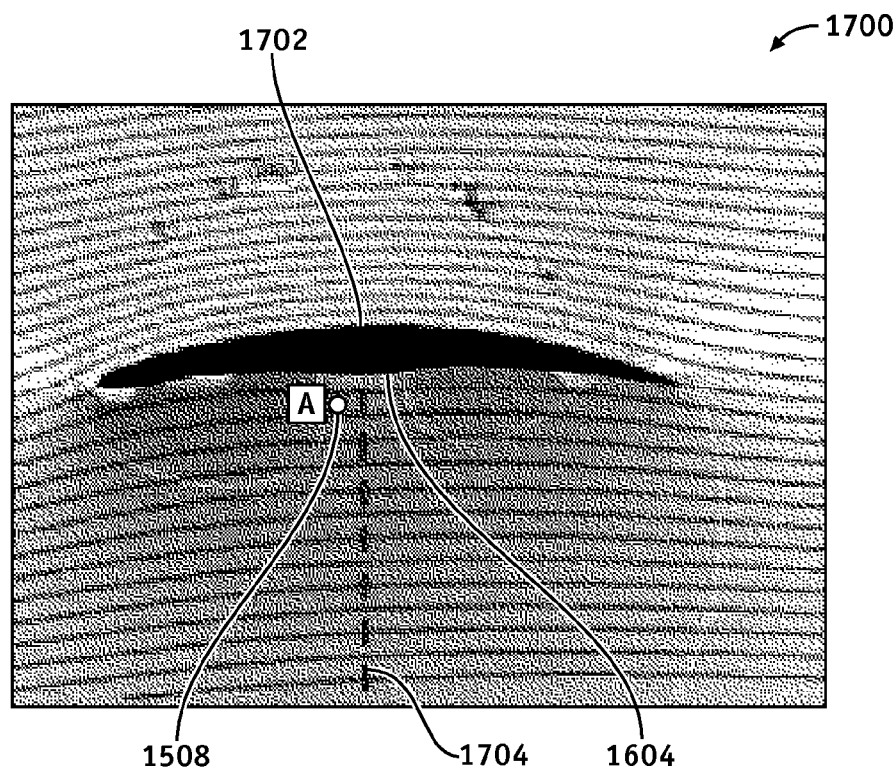
FIG. 17 is an illustration of an exemplary flow field showing a region of uniform flow field velocity near a structural enhancement on an underside of a wing airfoil according to an embodiment of the disclosure.

FIG. 17 is an illustration of an exemplary flow field 1700 showing a region 1704 of uniform flow field velocity near a structural enhancement such as the bump 1604 on an underside of the airfoil 1702 according to an embodiment of the disclosure. The embodiment shown in FIG. 17 combines the bump 1604 (FIG. 16) with the airfoil 1502 (FIG. 15). The bump 1604 speeds up a flow closer to the airfoil 1702, where it was previously travelling too slowly at point A 1508 in FIG. 15. A result is a large region of decelerated flow of uniform direction and speed such as the region 1704.

Figure 18:
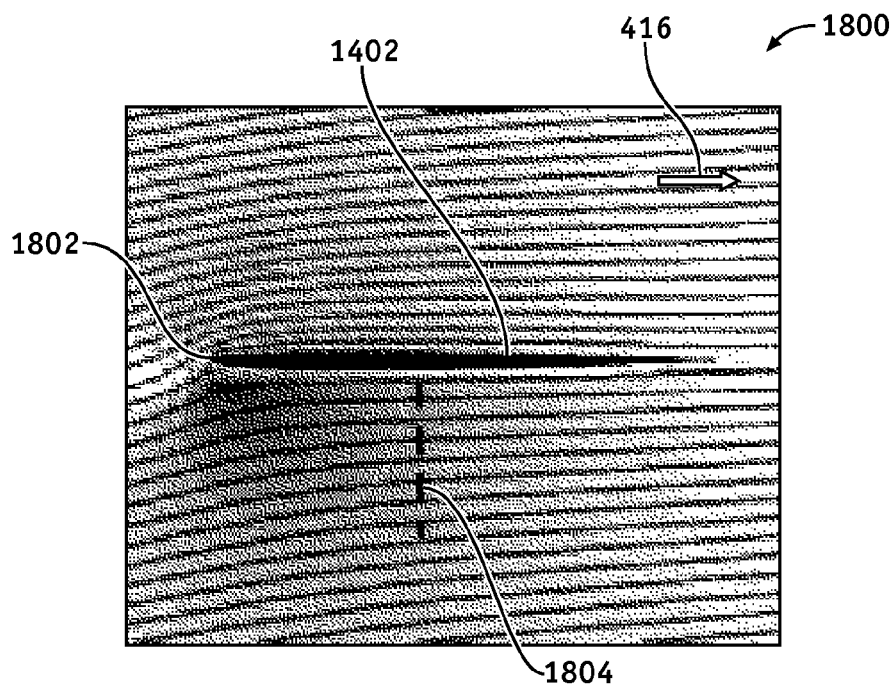
FIG. 18 is an illustration of an exemplary flow field showing a region of uniform flow field velocity for a positive angle of attack according to an embodiment of the disclosure.

FIG. 18 is an illustration of an exemplary flow field 1800 showing a region 1804 of uniform flow field velocity around the airfoil 1402 (FIG. 14), flying at a positive angle of attack. There is now a region 1804 of decelerated flow on the undersurface, concentrated near the leading edge 1802. Similar to the flow field shown 1500 in FIG. 15, there is not a significant region of uniform, decelerated flow that would be suitable for positioning the propulsor 606.

Figure 19:
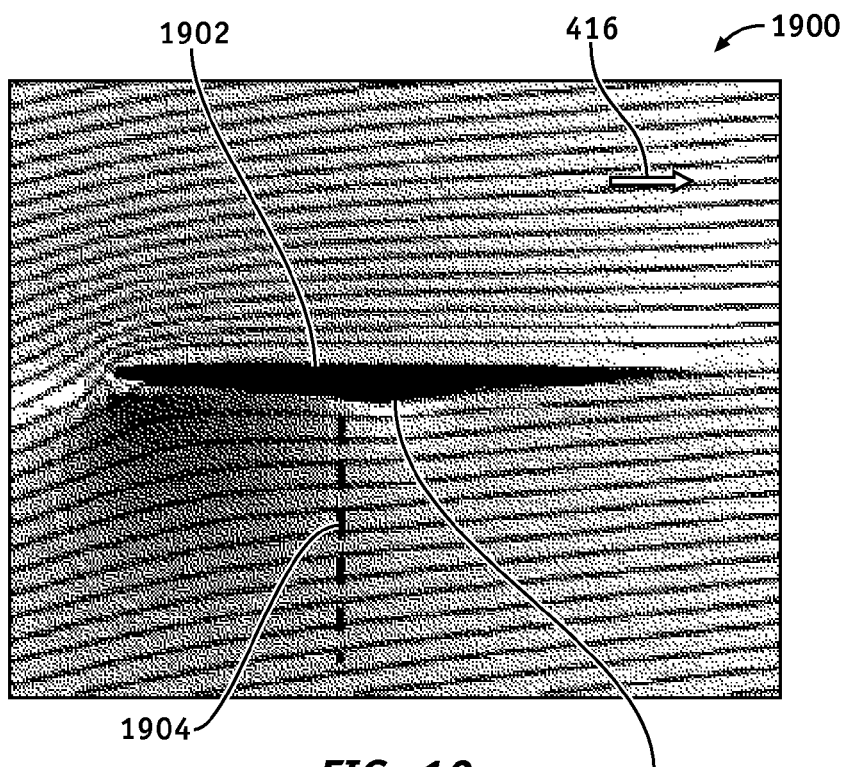
FIG. 19 is an illustration of an exemplary flow field showing a region of uniform flow field velocity near a structural enhancement on an underside of a wing airfoil for a positive angle of attack according to an embodiment of the disclosure.

FIG. 19 is an illustration of an exemplary flow field 1900 showing a region 1904 of uniform flow field velocity near a structural enhancement such as the bump 1604 on an underside of an airfoil 1902 at a positive angle of attack according to an embodiment of the disclosure. The embodiment shown in FIG. 19 shows a flat airfoil 1902 at a positive angle of attack, with the bump 1604 (FIG. 16) added. The bump 1604 allows for a larger region of uniform direction and speed suitable for positioning the propulsor 606 such as the region 1904.

Figure 20:
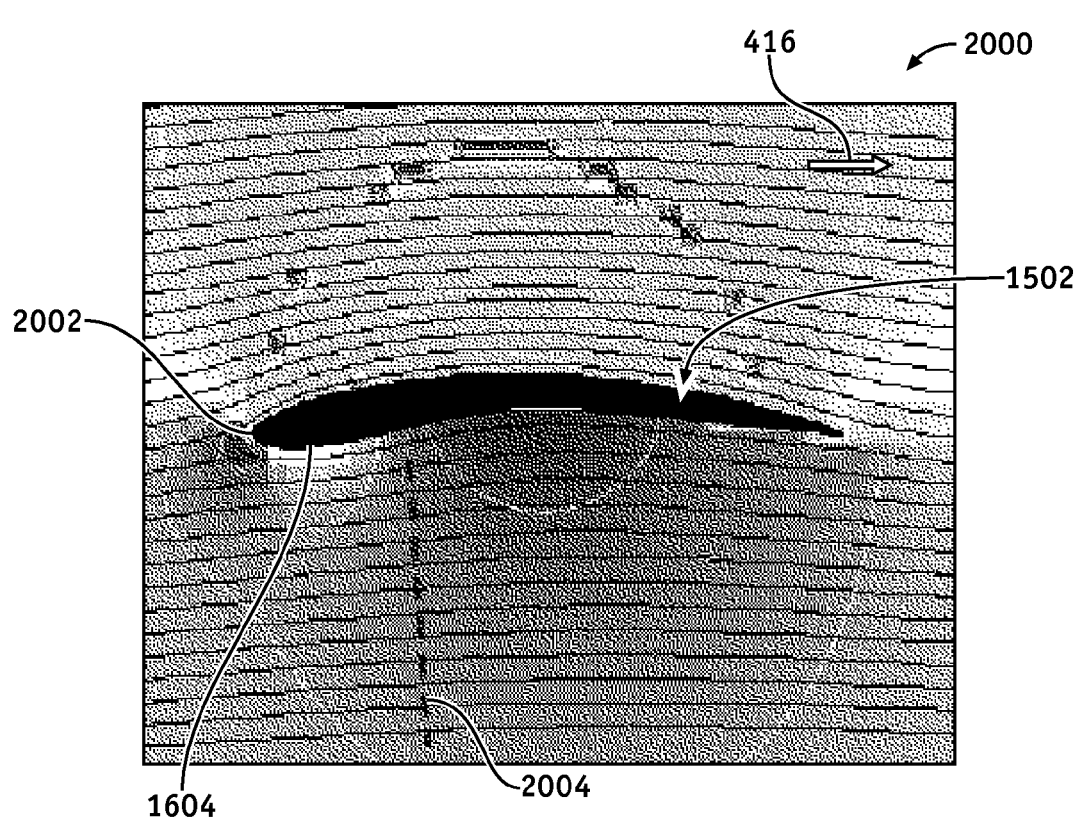
FIG. 20 is an illustration of an exemplary flow field showing a region of uniform flow field velocity near a structural enhancement near a wing airfoil leading edge according to an embodiment of the disclosure.

FIG. 20 is an illustration of an exemplary flow field 2000 showing a region 2004 of uniform flow field velocity near a structural enhancement located near a wing leading edge 2002 according to an embodiment of the disclosure. The embodiment shown in FIG. 20 shows the airfoil 1502 (similar to FIG. 15), but with the bump 1604 added near the wing leading edge 2002. Similar to the embodiment shown in FIG. 17, there is now a region of somewhat uniform decelerated flow such as the region 2004.

Figure 25:
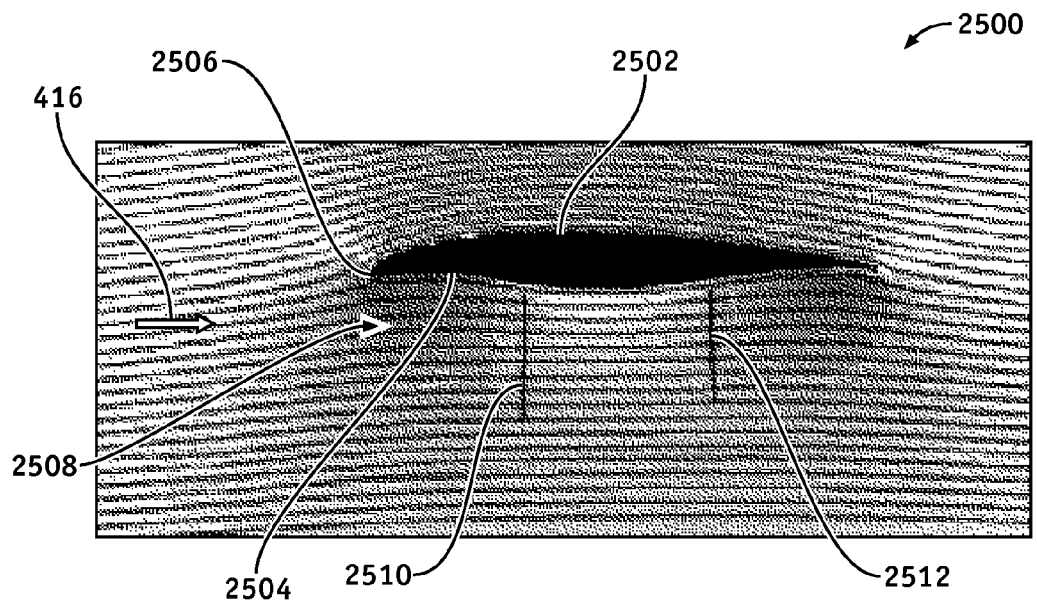
FIG. 25 is an illustration of an exemplary flow field showing a velocity reduction for increased aft camber and structural enhancement according to an embodiment of the disclosure.

The embodiments shown FIGS. 17, 19, and 20 are examples of using small features such as bumps (convex shapes) to tailor a larger region of decelerated flow. However, in other embodiments, the small features may also have concave shapes as shown in FIG. 25.

Figure 21:
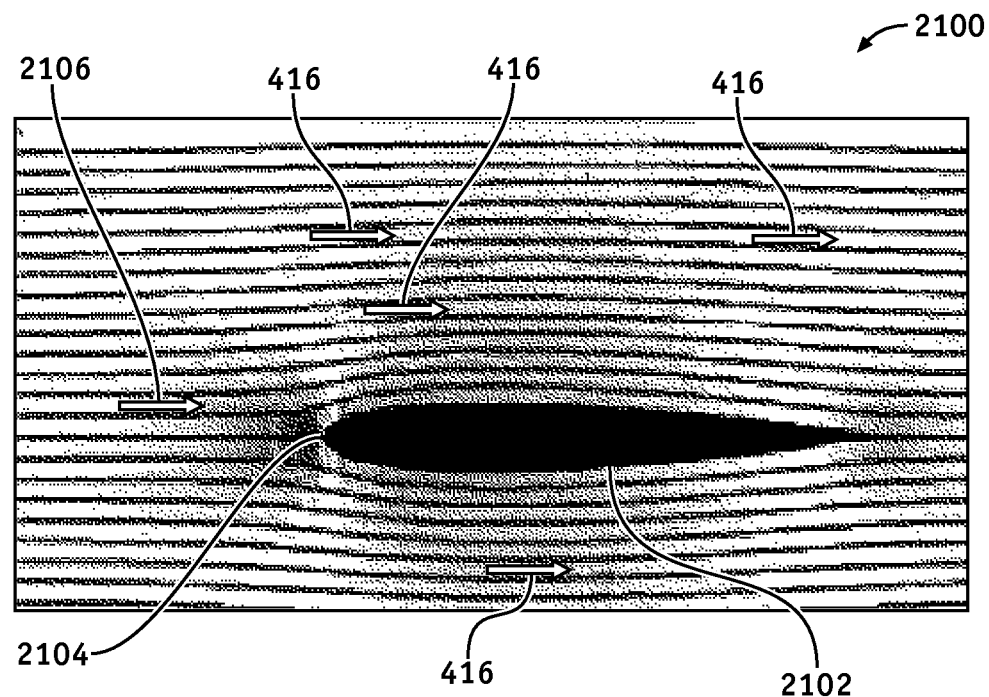
FIG. 21 is an illustration of an exemplary flow field showing a leading edge velocity reduction according to an embodiment of the disclosure.

FIG. 21 is an illustration of an exemplary flow field 2100 showing a leading edge velocity reduction according to an embodiment of the disclosure. The embodiment shown in FIG. 21 shows that a symmetrical airfoil 2102 at zero angle of attack accelerates the airflow above and below the wing 404 (FIG. 4) and generate no total lift. A small region with decelerated flow is near the stagnation point 2104.

Figure 22:
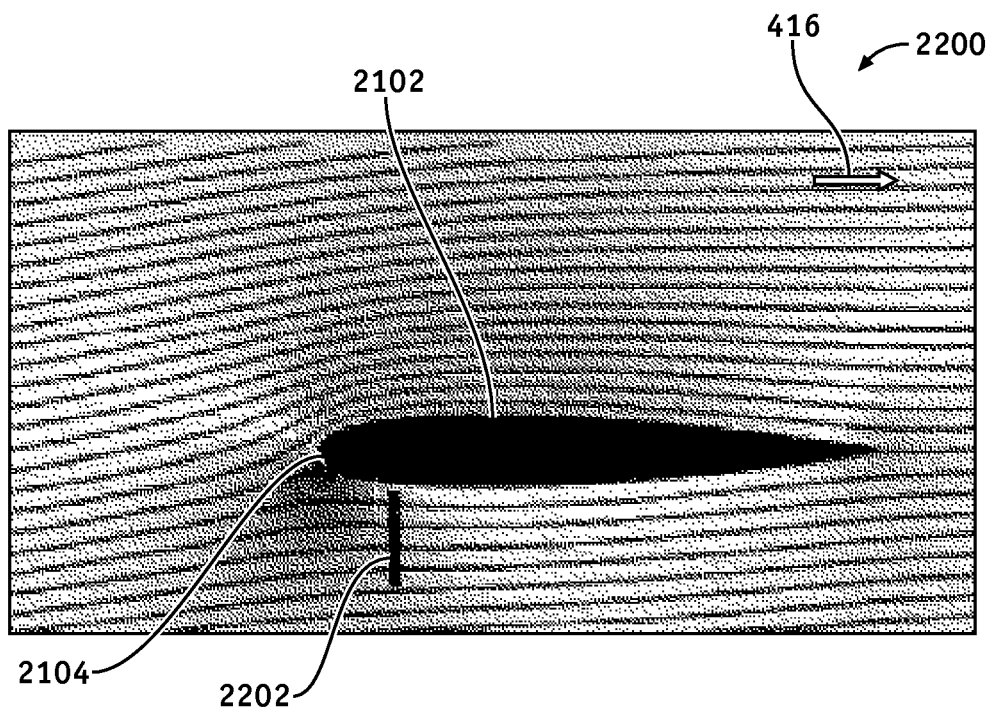
FIG. 22 is an illustration of an exemplary flow field showing a leading edge velocity reduction at a 5 degree angle of attack according to an embodiment of the disclosure.

FIG. 22 is an illustration of an exemplary flow field 2200 showing a leading edge velocity reduction at an about five degree angle of attack according to an embodiment of the disclosure. The embodiment shown in FIG. 22 shows the airfoil 2102 is flown with an about five degree angle of attack, generating lift. Airflow over a top surface of the airfoil 2102 is faster than in the embodiment shown in FIG. 14, and an airflow below the airfoil 2102 is now at approximately a velocity of the freestream 416 over most of the undersurface. A small region of decelerated flow such as the region 2202 with uniform velocity exists behind the stagnation point 2104 on a bottom surface of the airfoil 2102. A larger version of this flow is desirable for placement of the propulsor 606.

Figure 23:
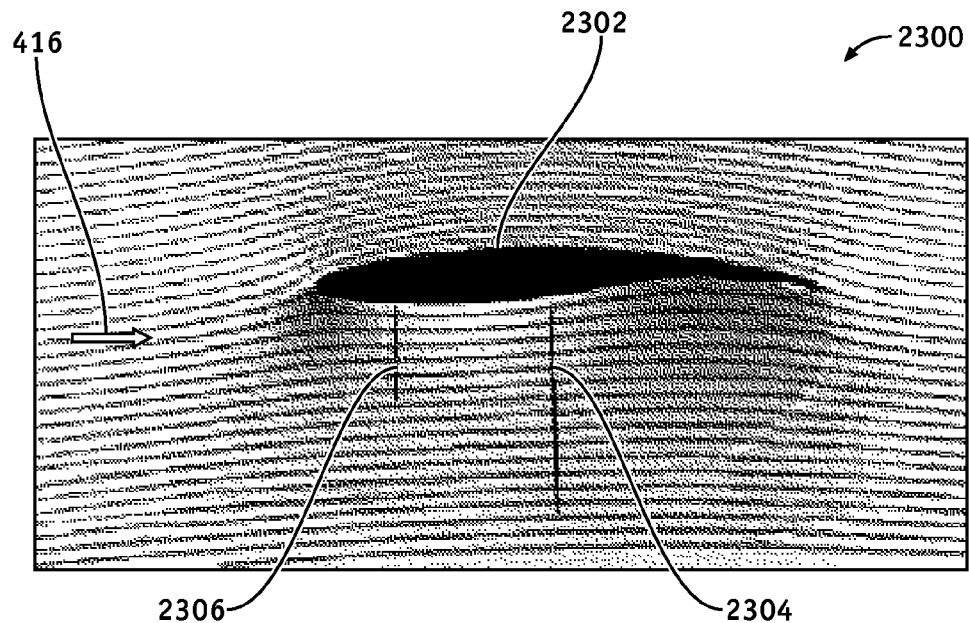
FIG. 23 is an illustration of an exemplary flow field showing a velocity reduction for a cambered airfoil according to an embodiment of the disclosure.

FIG. 23 is an illustration of an exemplary flow field 2300 showing a velocity reduction for a cambered airfoil 2302 of the wing 404 according to an embodiment of the disclosure. The embodiment shown in FIG. 23 shows the cambered airfoil 2302 producing lift. There is a large region 2304 of decelerated flow below the cambered airfoil 2302, and small regions 2306 of decelerated flow suitable for placing the propulsor 606.

Figure 24:
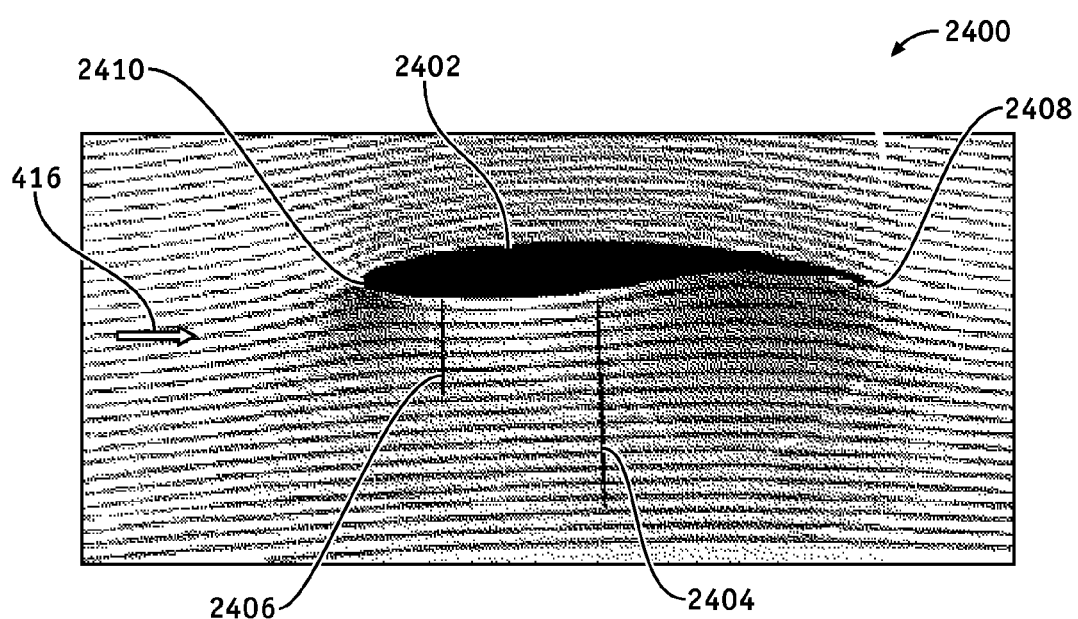
FIG. 24 is an illustration of an exemplary velocity reduction for increased aft camber according to an embodiment of the disclosure.

FIG. 24 is an illustration of an exemplary flow field 2400 showing a velocity reduction for an increased aft camber airfoil 2402 according to an embodiment of the disclosure. The embodiment shown in FIG. 24 shows the increased aft camber airfoil 2402 specifically designed to have the propulsor 606 placed beneath the wing 404 at about 50% chord. This is done by significantly slowing the flow on the undersurface of the increased aft camber airfoil 2402 near a trailing edge 2408 by increasing aft camber and adding a divergent trailing edge. A faster flow forward this region generates a vertical plane with constant velocity creating a region 2404 of uniform and reduced velocity suitable for placing the propulsor 606. A second region 2406 of uniform and reduced velocity is also created closer to a leading edge 2410, but may be too small for a practical propeller.

FIG. 25 is an illustration of an exemplary flow field 2500 showing a velocity reduction for an increased aft camber airfoil 2502 and structural enhancement according to an embodiment of the disclosure. The embodiment shown in FIG. 25 uses a concave shape structural enhancement 2504 on the undersurface of the wing 404, just aft of the leading edge 2506 to create a large region of decelerated flow 2508 (region 2508). Aft of the region 2508, there is a first location 2510 for placing the propulsor 606. Also, a second location 2512 further aft on the increased aft camber airfoil 2502 can be used to place the propulsor 606.

Figure 26:
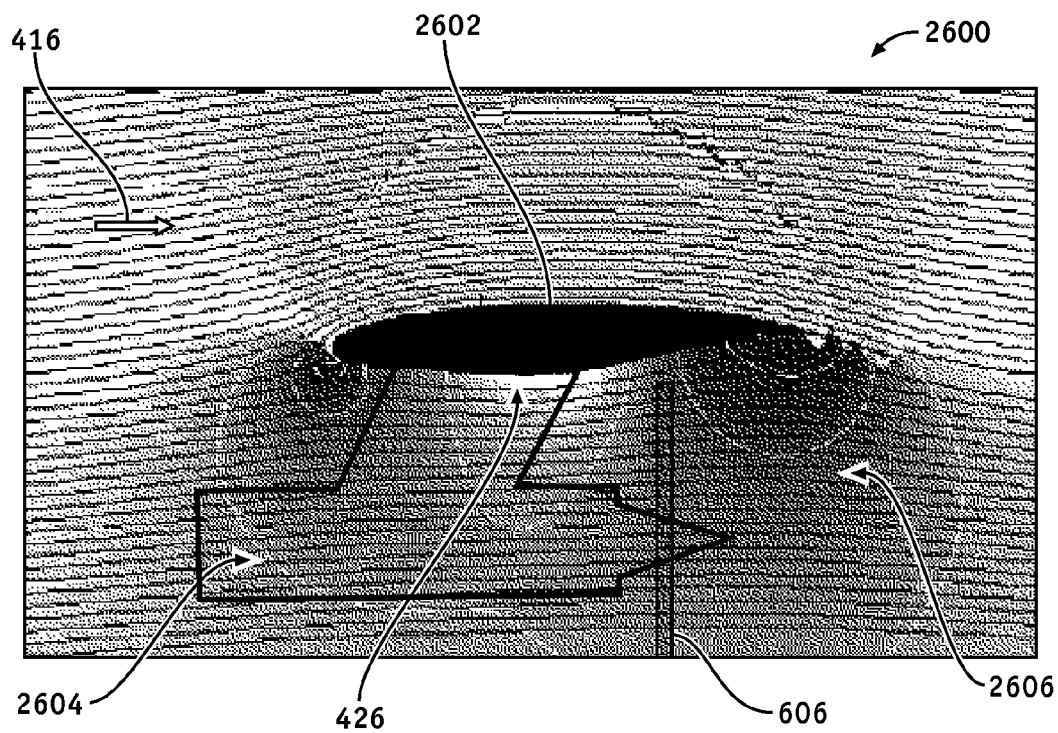
FIG. 26 is an illustration of an exemplary flow field showing a propeller placement in a region of uniform velocity according to an embodiment of the disclosure.

FIG. 26 is an illustration of an exemplary flow field 2600 showing a propeller placement in a region of uniform velocity according to an embodiment of the disclosure. The previous embodiments show various airfoils in an incompressible flow field. Compressibility changes the shape and size of the decelerated flow field. Compressibility drag is energy lost from blades reaching high Mach numbers (above ~0.7). Single rotation propellers have limited cruise speed because a tip speed of the blades 414 is limited to Mach 1.0 for noise and drag reasons. As a speed of an aircraft gets closer to Mach 1.0, a rotation speed (revolution per minute (RPM)) of a propeller must be reduced, where no rotation would be allowed at exactly Mach 1.0. Reducing compressibility drag on the blades 414 encourages long chords and sweep, which increases a drag and a weight of the blades 414. This weight can be reduced by smaller diameters, but this increases induced loss and swirl loss. Lower RPM also increases the swirl loss, as more energy is put into rotating the flow. Straightening vanes, wings and other surfaces can be used to straighten the flow, recovering some of the swirl loss. In contrast, embodiments of the disclosure provide a means for locating the propulsor 606 in a region of reduced velocity flow field to reduce the compressibility drag.

Compressibility effects influence the velocities and pressures created by an airfoil. The embodiment shown in FIG. 26 shows an airfoil 2602 that has used a Kármán-Tsien transformation to approximate the effects of the compressibility. A notional configuration is shown as an example integration of an engine 2604 and the propulsor 606 such that the propulsor 606 is located in a region of reduced flow field velocity 2606.

Figure 27:
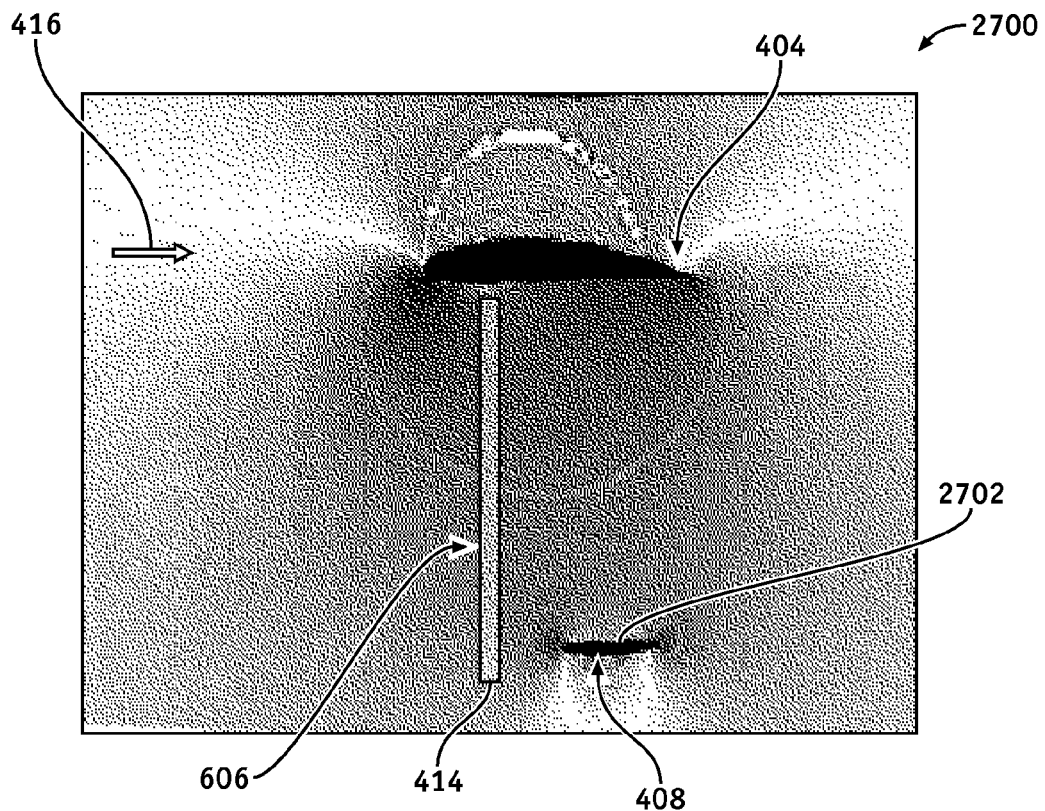
FIG. 27 is an illustration of an exemplary flow field showing a propeller placement in a region of uniform velocity in a wing-strut combination according to an embodiment of the disclosure.

FIG. 27 is an illustration of an exemplary flow field 2700 showing the propeller 606 placement in a region of uniform velocity in a wing-strut combination according to an embodiment of the disclosure. The embodiment shown in FIG. 27 shows a use of the strut 408 to control the region of slowed flow under the wing 404. The strut 408 airfoil 2702 creates negative lift, which slows the flow above strut 408. The strut 408 allows for greater slowing than just the wing 404 alone. The blades 414 extend below the strut 408, or stop somewhere above the strut 408.

Figure 28:
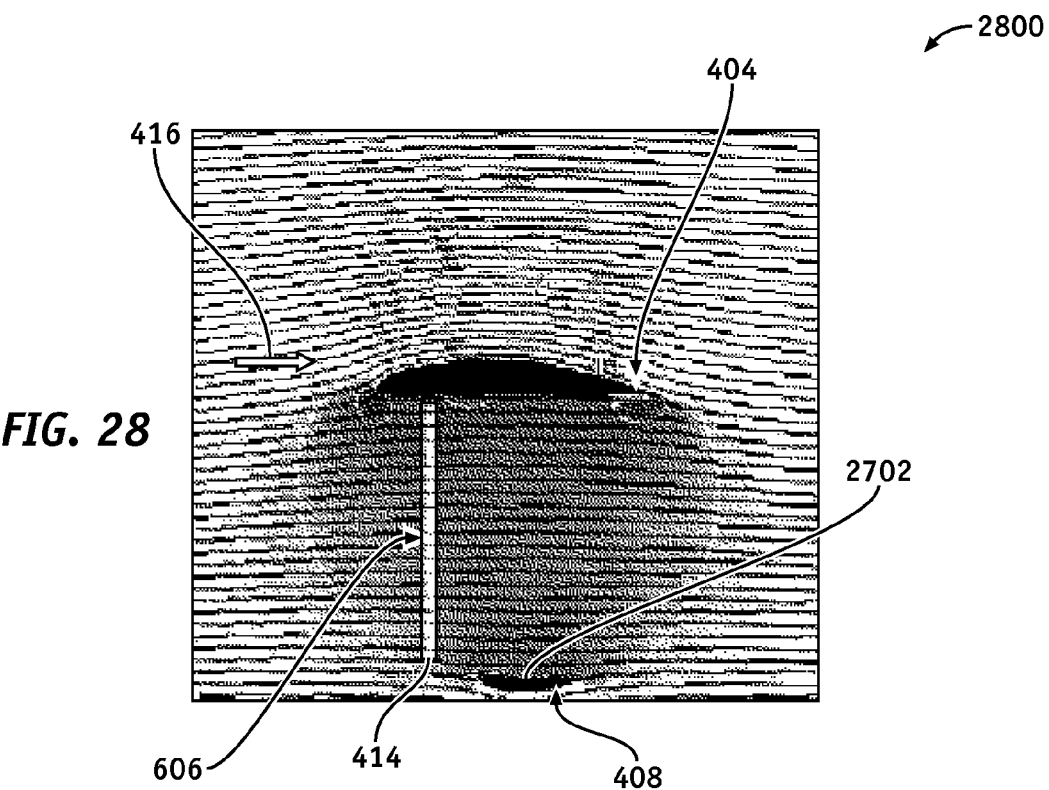
FIG. 28 is an illustration of an exemplary flow field showing a propeller placement in a region of uniform velocity in a wing-strut combination according to an embodiment of the disclosure.

FIG. 28 is an illustration of an exemplary flow field 2800 showing the propeller 606 placement in a region of uniform velocity in a wing-strut combination according to an embodiment of the disclosure. The blades 414 of the propeller 606 stop above the strut 408 in this embodiment.

Figure 29:
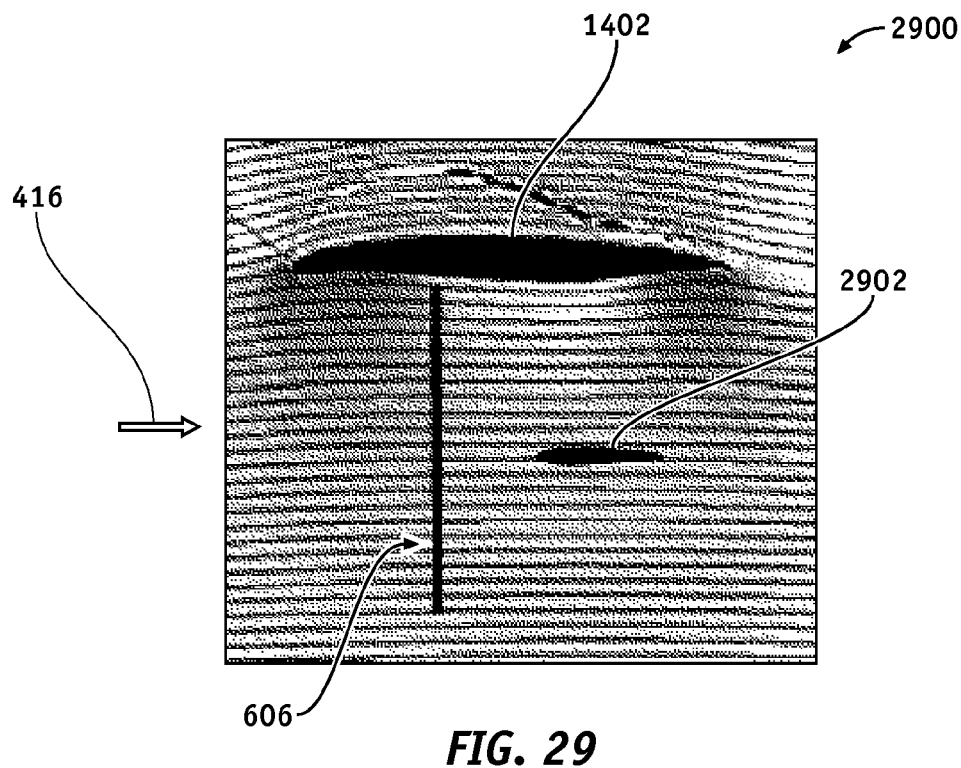
FIG. 29 is an illustration of an exemplary flow field showing a propeller placement in a region of uniform velocity in a wing-strut combination according to an embodiment of the disclosure.

FIG. 29 is an illustration of an exemplary flow field 2900 showing the propeller 606 placement in a region of uniform velocity in a wing-strut combination according to an embodiment of the disclosure. FIG. 29 is similar to the embodiment shown in FIG. 18, but a strut 2902 is used to support the engine pylori 426 (FIG. 4) and de-swirl wash from the propulsor 606. Unlike the embodiment shown in FIG. 20, a strut 2904 has less influence on the flow field. Swirl loss is energy lost by swirling flow about the propeller 606 axis 418 (FIG. 4) instead of directly accelerating flow downstream.

Figure 30:
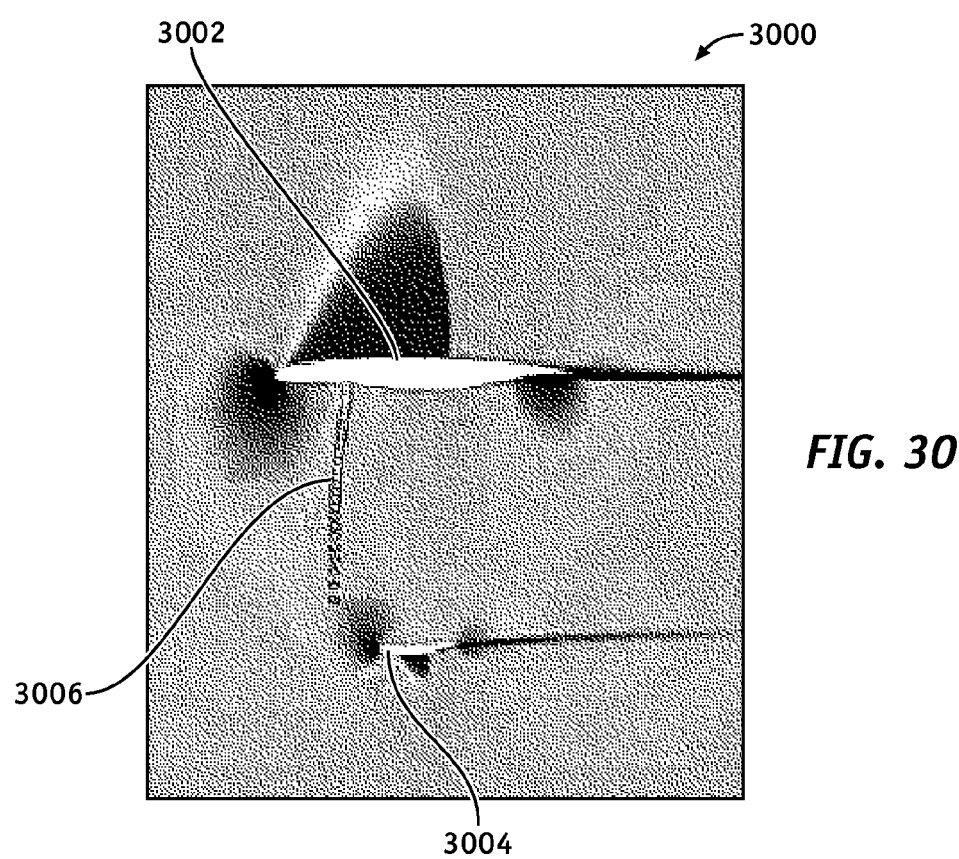
FIG. 30 is an illustration of an exemplary flow field showing a region of uniform velocity in a wing-strut combination according to an embodiment of the disclosure.

FIG. 30 is an illustration of an exemplary flow field 3000 showing a region of uniform velocity in a wing-strut combination according to an embodiment of the disclosure. The previous embodiments do not include an effect of the flow acceleration created from the propulsor 606 which may also influence the overall shaping of the aerodynamic structure 602 (wing, struts, fuselage, nacelle, pylori, etc). The embodiment shown in FIG. 30 shows a structure comprising a wing airfoil 3002 and a strut airfoil 3004 that also comprises effect of the flow acceleration created from the propulsor 606. Due to the large size of the blades 414, the influence of the flow acceleration created from the propulsor 606 is very small.

The above embodiments illustrate some of the aerodynamic variables that may be applied to achieve a large region of reduced velocity flow field. Those skilled in the art will recognize that similar shaping of other airplane components can be used to strengthen or fine tune this effect. For example but without limitation, shaping of the fuselage, landing gear pod, engine nacelle, external fuel tanks, a combination thereof, and the like, may also be applied to augment the basic effect from the wing 404.

In this manner, embodiments of the disclosure provide a reduced velocity flow field region for efficiency improvement of the propulsor 606 positioned and operating in the reduced velocity flow field region.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the processor module 614 to cause the processor module 614 to perform specified operations. Such instructions, generally referred to as "computer program code" or "program code" (which may be grouped in the form of computer programs or other groupings), when executed, enable power utilization scheduling methods of the system 700.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-30 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

As used herein, unless expressly stated otherwise, "operable" means able to be used, fit or ready for use or service, usable for a specific purpose, and capable of performing a recited or desired function described herein. In relation to systems and devices, the term "operable" means the system and/or the device is fully functional and calibrated, comprises elements for, and meets applicable operability requirements to perform a recited function when activated. In relation to systems and circuits, the term "operable" means the system and/or the circuit is fully functional and calibrated, comprises logic for, and meets applicable operability requirements to perform a recited function when activated.

The invention claimed is:

1. A method for reducing flow field velocity into a fan or propeller, the method comprising:
    shaping an aircraft wing to include an aerodynamic structure enhancement that is shaped to provide a reduced flow field velocity deviation region below the aerodynamic structure enhancement, wherein the reduced flow field velocity deviation region comprises a region having flow field velocities with a substantially uniform speed that is lower than a freestream velocity; and
    positioning the fan or propeller at least partially within the reduced flow field velocity deviation region below the aerodynamic structure enhancement of the aircraft wing such that the fan or propeller is aft of a leading edge of the aircraft wing and forward of a trailing edge of the aircraft wing.

2. The method according to claim 1, wherein the fan or propeller comprises at least one member selected from the group consisting of: a propeller, a turbofan, a propfan, and an unducted fan.

3. The method according to claim 1, further comprising changing at least one physical property of an aerodynamic structure coupled to the aircraft wing to control the reduced flow field velocity deviation region.

4. The method according to claim 3, wherein the step of changing the aerodynamic structure comprises at least one member selected from the group consisting of: changing a shape of the aerodynamic structure, changing a position of a flap, and changing a position of the aerodynamic structure.

5. The method of claim 1, wherein the aerodynamic structure enhancement is on an undersurface of the aircraft wing.

6. A flow field velocity reduction system comprising:
    an aircraft wing having an aerodynamic structure enhancement that is shaped to provide a reduced flow field velocity deviation region below the aerodynamic structure enhancement, wherein the reduced flow field velocity deviation region comprises a region having flow field velocities with a substantially uniform speed that is lower than a freestream velocity; and
    a fan or propeller configured to operate in the reduced flow field velocity deviation region below the aerodynamic structure enhancement of the aircraft wing such that the fan or propeller is aft of a leading edge of the aircraft wing and forward of a trailing edge of the aircraft wing.

7. The flow field velocity reduction system according to claim 6, wherein the fan or propeller comprises at least one member selected from the group consisting of: a propeller, a turbofan, a propfan, and an unducted fan.

8. The flow field velocity reduction system according to claim 6, further comprising an aerodynamic structure coupled to the aircraft wing.

9. The flow field velocity reduction system according to claim 8, wherein the aerodynamic structure is operable to change a first physical property to control the reduced flow field velocity deviation region.

10. The flow field velocity reduction system according to claim 9, wherein the first physical property comprises at least one member selected from the group consisting of: a shape of the aerodynamic structure, a position of a flap, and a position of the aerodynamic structure.

11. The flow field velocity reduction system according to claim 6, further comprising:
    a strut coupled to a body of the aircraft configured to increase the size of the reduced flow field velocity deviation region or reduce the flow field velocities in the reduced flow field velocity deviation region.

12. The flow field velocity reduction system according to claim 11, wherein the strut is configured to generate a negative lift.

13. The flow field velocity reduction system of claim 6, wherein the aerodynamic structure enhancement is on an undersurface of the aircraft wing.

14. A method for providing a flow field velocity reduction system comprising:

provinding an aircraft wing having an aerodynamic stucture enhancement that is shaped to provide a reduced flow field velocity deviation region below the aerodynamic structure enhancement of the aircraft wing, and wherein the reduced flow field velocity deviation region comprises a region having flow field velocities with a substantially uniform speed that is lower than a freestream velocity; and providing a fan or propeller configured to operate in the reduced flow field velocity deviation region below the aerodynamic structure enhancement of the aircraft wing such that the fan or propeller is aft of a leading edge of the aircraft wing and foward of a trailing edge of the aircraft wing.

15. The flow field velocity reduction system according to claim 11, wherein the strut is coupled to the fan or propeller and configured to reduce swirl in a wake of the fan or propeller.

16. The method of claim 14, wherein the aerodynamic structure enhancement is on an undersurface of the aircraft wing.

* * * * *